US006997503B2

(12) United States Patent
Fukagawa

(10) Patent No.: US 6,997,503 B2
(45) Date of Patent: Feb. 14, 2006

(54) AUTOMOBILE BODY COVER

(75) Inventor: Yoshiharu Fukagawa, Hiroshima (JP)

(73) Assignee: La Parole Co., Ltd., Hiroshima (JP)

( * ) Notice: Subject to any disclaimer, the term of this patent is extended or adjusted under 35 U.S.C. 154(b) by 0 days.

(21) Appl. No.: 10/504,733

(22) PCT Filed: Feb. 14, 2003

(86) PCT No.: PCT/JP03/01610

§ 371 (c)(1),
(2), (4) Date: Aug. 16, 2004

(87) PCT Pub. No.: WO03/068547

PCT Pub. Date: Aug. 21, 2003

(65) Prior Publication Data

US 2005/0104410 A1 May 19, 2005

(30) Foreign Application Priority Data

Feb. 15, 2002 (JP) ............................ 2002-038468
Sep. 27, 2002 (JP) ............................ 2002-283312

(51) Int. Cl.
*B60J 11/00* (2006.01)

(52) U.S. Cl. ............................ 296/136.13; 296/136.1; 150/166

(58) Field of Classification Search .................. 296/98, 296/136.08, 136.06, 136.1, 136.12, 136.13, 296/136.07; 150/166

See application file for complete search history.

(56) References Cited

U.S. PATENT DOCUMENTS 2,646,097 A * 7/1953 Gaverth et al. ............. 150/166
4,966,406 A * 10/1990 Karasik et al. ............... 296/98
4,972,892 A * 11/1990 Yeh ............................ 150/166
5,364,156 A * 11/1994 Zerow ................... 296/136.13
6,131,643 A * 10/2000 Cheng et al. ................. 296/98
6,588,827 B1 * 7/2003 Heiland ...................... 150/166
6,644,716 B1 * 11/2003 McNabb .................... 296/95.1
2001/0045758 A1 * 11/2001 Vieira-Soares .............. 296/136

FOREIGN PATENT DOCUMENTS

JP 3-38128 4/1991
JP 8-104142 4/1996

* cited by examiner

*Primary Examiner*—Jason Morrow
(74) *Attorney, Agent, or Firm*—Jordan and Hamburg LLP

(57) ABSTRACT

An automobile cover can easily cover an automobile and an automobile body covering device can store the body cover into a trunk without injuring or remodeling an automobile body. To achieve such a goal, fold line portions for guiding folding are formed on a cover body such that the fold line portions extend in the longitudinal direction of the cover body, the cover body is configured to be foldable along the fold line portions, and a plurality of core members are arranged between the fold line portions and left and right longitudinal-side edges of the cover body in a spaced-apart manner in the longitudinal direction.

15 Claims, 34 Drawing Sheets

FIG. 25(a)
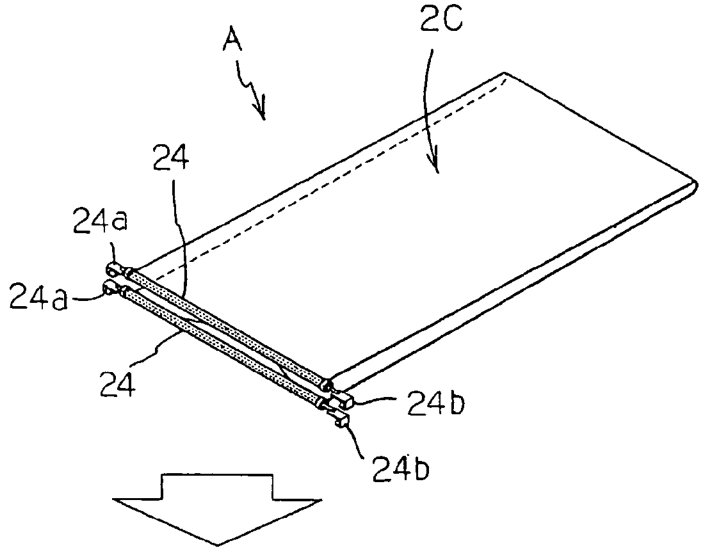
FIG. 25(b)
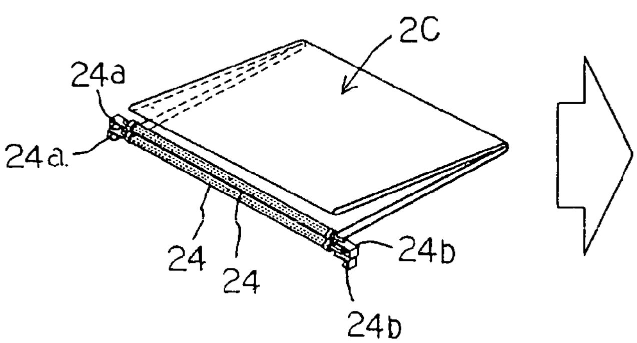
FIG. 25(c)
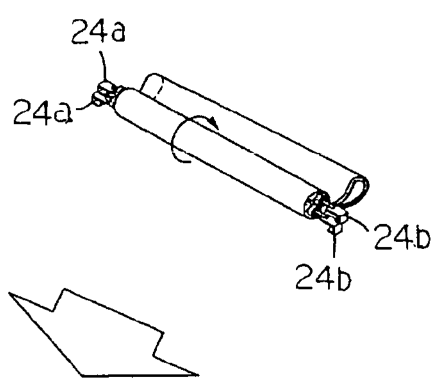
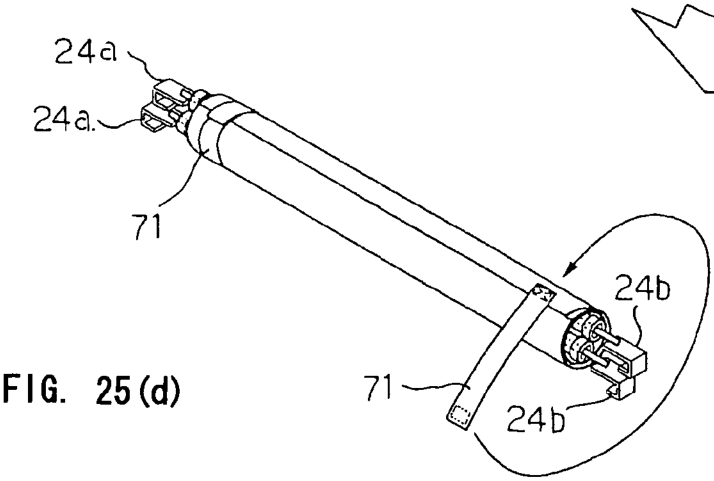
FIG. 25(d)

AUTOMOBILE BODY COVER

TECHNICAL FIELD

The present invention relates to an automobile body cover.

Conventionally, as an automobile body cover device, there has been known an automobile body cover device having the following constitution (for example, see Japanese Unexamined Patent Publication Hei8(1996)-104142).

That is, a porch which houses a body cover is mounted on a back surface of a trunk lid and one end of a body cover is connected to a porch. In covering an automobile body with the body cover, a distal end of the body cover is pulled out through a gap defined between a peripheral portion of a proximal end of the trunk lid and a peripheral portion of an opening portion of the trunk room, while in removing the body cover, the body cover is pulled in from the porch side thus ensuring a simple operation. Further, the body cover is stored in the inside of the porch formed on a back surface of the trunk lid.

Further, there has been also known an automobile body cover device which has the following constitution (for example, see Japanese Unexamined Utility Model Publication Hei3(1991)-38128).

A reel device which rotates a roller which winds a body cover thereon in the winding direction is mounted on a back surface of a trunk lid and the body cover is always stored in the inside of a trunk. To cover an automobile body with the body cover, in the same manner as the above-mentioned prior art, a distal end of the body cover is pulled out through a gap defined between a peripheral portion of a proximal end of the trunk lid and a peripheral portion of the opening portion of the trunk room and is unfolded over a roof of a automobile body so as to cover the automobile body.

Then, in removing the body cover, the winding device is operated so as to allow the roller to automatically wind the cover and the body cover is stored in the inside of the trunk.

However, with respect to the above-mentioned conventional automobile body cover devices, no attention has been focused on the body cover per se which is used in the automobile body cover device and constitutes an essential part of the automobile body cover device and no particular ideas have been proposed on the automobile body cover device. Accordingly, the automobile body cover devices have not yet been popularly used at present.

On the other hand, to focus attentions on the automobile body cover per se, there has been known an automobile cover having the following constitution, for example (see Japanese Unexamined Patent Publication 2000-88322, for example).

That is, there is provided a cover in which a plurality of annular springs made of a spring material having a narrow width are arranged on and are fixed to an automobile cover material, the cover material is foldable for every zone unit defined by the fixing of the annular springs, and the cover includes means for fixing the cover to the automobile. Here, a user grips both sides of a portion of the cover in a folded state which is arranged in front of the annular spring portion with his both hands and applies pressure to the cover inwardly so that a clamping force acts on a center portion at an opposite side. Accordingly, the opposite side of the annular spring is resiliently deformed and is reversed in an approximately small circular shape, a grip portion of the annular spring which is also formed in a small circular shape is overlapped to this small circular shape portion, whereby the cover is foldable to a size which is one third of the original size of the annular spring.

This structure allows the easy handling of the cover and the rapid removal of the cover. Further, the folding operation requires small time and efforts, there is no possibility that clothing is smeared, and the cover can be folded in an extremely compact form.

Although the above-mentioned automobile body cover can be folded in a compact form as a matter of fact, the automobile body cover still has drawbacks to be solved in an actual operation on a roof of an automobile.

That is, even when the body cover folded in a compact has no rigidity except for the center portion of the cover where the above-mentioned annular spring is fixedly secured, to open the portions of the cover which correspond to sides of the automobile, the user must perform the covering operation while moving. This operation becomes extremely difficult when the operation is performed under a strong wind.

Further, also in storing the body cover, it is difficult to perform an operation to fold the above-mentioned side portions of the body cover to the inside in a state that body cover is held on the roof. Particularly, when the wind blows, it is almost impossible to perform the folding operation against the wind.

Accordingly, it is necessary for the user to carry the body cover to other place in a state that the body cover is folded for every zone unit defined by fixing of the annular springs and, thereafter, the user folds the body cover into a small circular shape while taking care of appearance of the body cover. Further, since such a folding operation requires some strength, the operation imposes a considerable burden to a woman or an aged person.

Further, the body cover which is used in the above-mentioned conventional automobile body cover device also has many drawbacks.

That is, even when the cover material is thin, the cover material having an area which can cover the automobile body becomes necessary and hence, the cover material has a considerable weight. Further, the cover material is configured to have no rigidity. Accordingly, in both of the above-mentioned case in which the body cover is stored in the porch or the above-mentioned case in which the body cover is wound around the roller, a considerable load is imparted to the user.

Further, although it is necessary to unfold the body cover on the roof of the automobile in covering the automobile with the body cover and to fold the body cover on the roof of the automobile in storing the body cover, since the body cover requires an area which is large enough to cover the body cover as mentioned above, the above-mentioned operation cannot be performed easily with the body cover having no rigidity as a matter of course.

Further, even when skeletal members are simply provided to the cover to achieve the rigidity, this does not enhance the operability on the roof and the layout of the skeletal members still remains as a task to be solved. Eventually, it has been practically difficult to use the automobile body cover in a state that the body cover can be automatically reeled out and in without any trouble.

It is an object of the present invention to provide an automobile body cover which can overcome the above-mentioned drawback.

SUMMARY OF THE INVENTION

According to the present invention, fold line portions for guiding folding are formed on a cover body such that the fold line portions extend in the longitudinal direction of the cover body, the cover body is configured to be foldable along the fold line portions, and a plurality of core members comprised of spring steel are arranged between the fold line portions and left and right longitudinal-side edges of the cover body in a spaced-apart manner in the longitudinal direction.

Further, according to the present invention, the above-mentioned fold line portions for guiding folding are formed in plural numbers.

Further, according to the present invention, the above-mentioned cover body is formed in a shape which is capable of covering a roof portion and front-and-rear and left-and-right window portions of an automobile, and is foldable in three along the longitudinal direction by way of two fold line portions into a center portion which covers the front and rear window portions and a left-side portion and the roof portion and a right-side portion which cover left and right window portions, and a plurality of core members are formed on the center portion, the left-side portion and the right-side portions respectively.

Further, according to the present invention, the above-mentioned cover body is formed in a shape which is capable of covering a roof portion and front-and-rear and left-and-right window portions of an automobile, and is foldable in three along the longitudinal direction by way of two fold line portions into a center portion which covers the front and rear window portions and a left-side portion the roof portion and and a right-side portion which cover left and right window portions, and a plurality of core members are formed on the center portion, the left-side portion and the right-side portions respectively.

Further, according to the present invention, the above-mentioned cover body is formed i a shape which is capable of covering a roof potion and fron-and-rear and left-and-right window portions of an automobile, and is foldable in three along the longitudinal direction by way of two fold line portions into a center portion which covers the front and rear window portions and the roof portion and a left-side portion and a right-side portion which cover left and right window portions, and a plurality of core members made of spring steel are formed on the center portion, the left-side portion and the right-side portions respectively.

Further, according to the present invention, the body cover includes hinge portions which facilitate a folding operation of the core members.

Further, according to the present invention, pipe-like core members are provided to front ends and/or rear ends of the above-mentioned cover body.

Further, according to the present invention, the above-mentioned cover body is configured to be stored in an automobile body cover device which includes winding means such that the above-mentioned cover body is reeled out from and is wound in the automobile body cover device.

BRIEF EXPLANATION OF DRAWINGS

FIG. 25 is an explanatory view showing a step of folding the body cover.

DESCRIPTION OF THE PREFERRED EMBODIMENT

Figure 1:
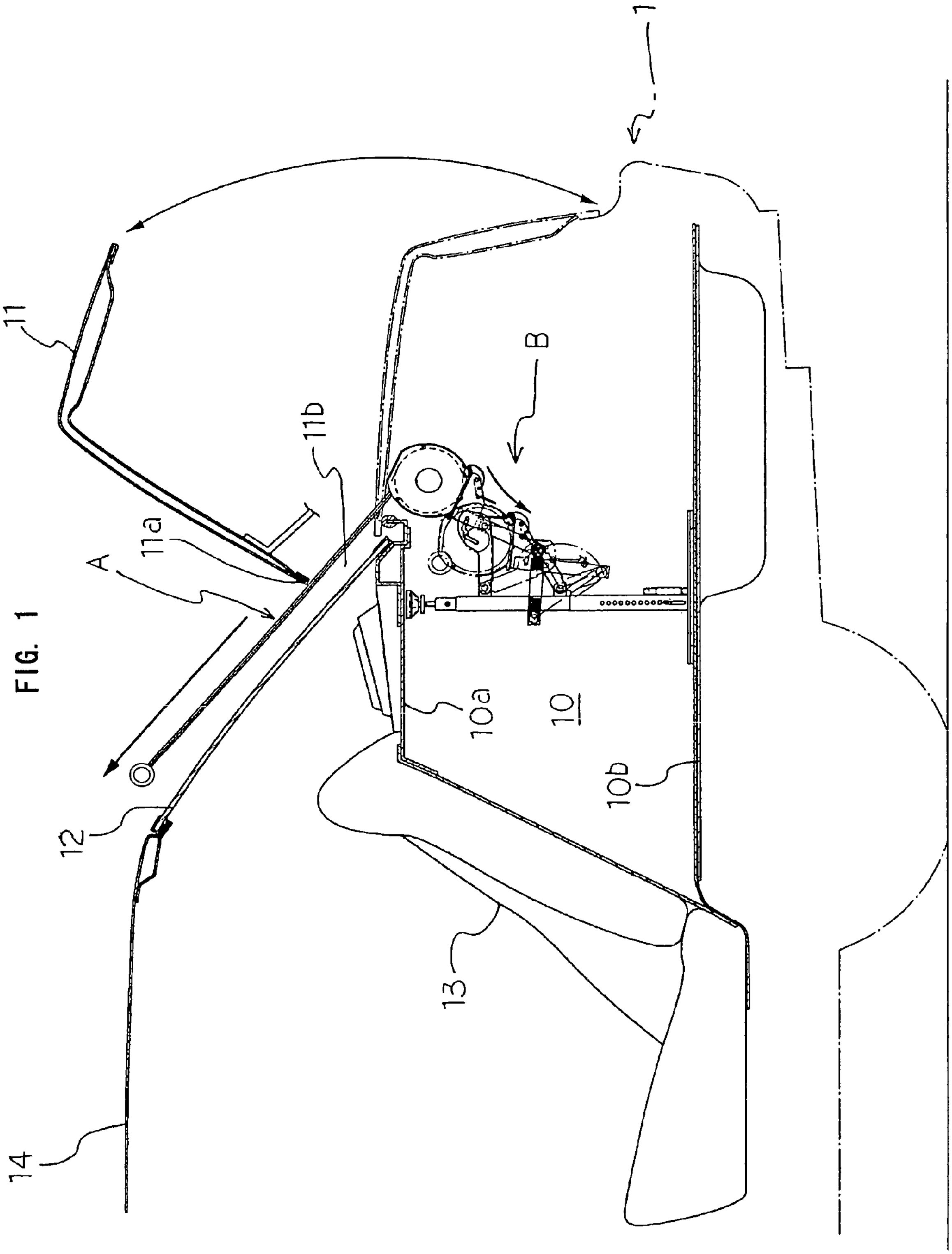
FIG. 1 is an explanatory view showing a use state of a cover device provided with a body cover.

An automobile body cover (hereinafter referred to as "body cover") according to the present invention is configured such that fold line portions for guiding folding are formed on a cover body in the longitudinal direction such that the fold line portions extend in the longitudinal direction of the cover body so as to allow the cover body foldable along the fold line portions, and a plurality of core members are arranged between the fold line portions and left and right longitudinal edges of the cover body in a given interval in the longitudinal direction.

The above-mentioned fold line portions for guiding folding may be formed in plural numbers so as to provide the body cover of a versatile folded state in which the body cover is folded in three or more. Particularly, as in the case of this embodiment, it is preferable to form the fold line portions such that two fold line portions extend in parallel in the longitudinal direction of the cover body.

Then, while constituting the body cover such that the body cover can be folded in three along two fold line portions, a plurality of core members are arranged in parallel at a given interval in the longitudinal direction between the fold line portions and the left and right longitudinal side edges of the cover body.

That is, it is difficult to unfold or fold the body cover such as a generally-available body cover which has no rigidity on the roof. However, with the provision of the fold line portions and the core members, in performing the operation to fold the left-side and right-side portions of the cover body inwardly and to open these left-side and right-side portions to the outside, by merely holding an end portion of one longitudinal edge of the cover body and performing the folding operation or unfolding operation from one side, the whole left-side and right-side portions of the cover body follow such operations whereby an operator can smoothly perform the operation without moving. Particularly, when two fold line portions are formed so as to allow the folding of the cover body in three, the above-mentioned advantageous effect becomes apparent whereby the operability is remarkably enhanced not only with respect to the covering operation but also with respect to the storing manipulation.

Further, with the use of the core members having resiliency, even when the wind blows during the operation and it is necessary to fold the cover body against the wind, the core members deflect with resiliency and maintain the low posture such that the cover body extends along the roof of the automobile and hence, it is possible to perform the folding operation by reducing the resistance of the wind as much as possible.

Here, the core members are not always required to possess the resiliency and, for example, it is possible to cope with the wind by providing hinge portions which assist the folding operation of the core members to the core members.

Further, it is preferable to mount pipe-like core members to a front end and/or a rear end of the cover body. While these pipe-like core members perform a function as grip portions, it is possible to easily wind the cover body using these pipe-like cores as the center of winding at the time of winding the cover body in a roll shape.

Further, the body cover can be stored in an automobile body cover device (hereinafter referred to as "cover device") in a state the body cover can be reeled in an out from the cover device.

That is, with respect to a body cover having no rigidity such as a general-use body cover, it is difficult to unfold the body cover to the roof by reeling out the body cover along a rear glass and to unfold the body cover over the roof. However, by providing the fold line portions and the core members to the body cover, it is possible to perform such operations smoothly. Further, even at the time of storing the body cover, the body-cover folding operation can be easily performed and, at the same time, the winding of the body cover into the cover device can be also easily performed.

In this manner, the body cover according to this embodiment exhibits the favorable operability in reeling out and winding of the cover body and, at the same time, the body cover can prevent the collapse of shape at the time of reeling out and winding of the cover body. Accordingly, with respect to the series of operations to cover the automobile, the operability can be remarkably enhanced.

Here, to facilitate the handling of the above-mentioned cover body, it is preferable to form the cover body in a shape which is capable of covering the roof portion and the front-and-rear and left-and-right windows of the automobile and has at least a small area which can prevent sunbeams from directly entering the inside of a chamber of the automobile. Due to such a constitution, it is also possible to prevent the freezing of the glass and the direct stacking of snow on the glass during the winter season.

Further, the cover body may be configured as follows. That is, the cover body is foldable in three along two fold line portions into the center portion which covers the front and rear window portions and the roof portion and the left-side portion and the right-side portion which respectively cover the left and right window portions, and the above-mentioned plurality of core members are provided to the center portion, the left-side portion and the right-side portion respectively.

Accordingly, it is possible to easily perform the unfolding of the cover body on the roof at the time of covering operation and, at the same time, the folding operation can be easily performed.

For example, in unfolding or folding the body cover on the roof, with the provision of the core members, by merely jerking the cover body while holding one portion thereof such as a front side, a rear side or the like of the left and right-side portions, it is possible to jerk the whole left and right-side portions of the body cover and hence, the body cover can be extremely easily handled and, at the same time, the operation can be easily performed even the wind blows more or less. Particularly, when the core members are formed of members having resiliency, it is possible to perform the folding operation against the wind by performing the operation while making the cover body take the low posture along the roof. Alternatively, also in this case, as explained above, it may be possible to cope with the situation by configuring the cover body such that the cover body is provided with hinge portions which assist the folding operation of the core members.

Here, as the measure to cope with the wind, for example, each of the left and right-side portions of the body cover may be two-split in the fore-and-aft direction in the vicinity of the center portion to reduce the handling area and hence, a front side portion and a rear side portion can be individually unfolded and folded. In this case, it is preferable that the front side portion and the rear side portion can be suitably connected using a fastener or the like. Further, connecting strings may be attached to the vicinities of the center portions of the left and right-side portions of the body cover and distal ends of the connecting strings may be engaged with a body of an automobile so as to prevent the body cover from being blown up by the wind or the like. Further, in folding the body cover in the wind, by pulling up the cover over the roof of the automobile using connecting strings, it is possible to facilitate the folding of the body cover.

Further, in reeling out the body cover and unfolding the left and right-side portions, to prevent the body cover from being displaced due to the wind or the like, temporary fixing means such as suction cups which can temporarily fix the cover body to a bonnet of an automobile may be provided to the distal end portion of the cover body.

Further, it is preferable that the core members which are respectively provided to the center portion, the left-side portion and the right-side portion of the cover body are made of a strip-like body having resiliency. For example, a material having resiliency such a spring steel material can be preferably used. Further, it is preferable that the arrangement positions of these core members are displaced from each other to prevent these core members from being overlapped to each other when the cover body is folded in three.

It is preferable that the cover device provided with the above-mentioned body cover includes a device body which is configured to be capable of reeling out and winding the cover body and stand portions which mount the device body thereon by way of link mechanisms, wherein resilient support members are mounted on the stand portions in an extensive manner, and the cover device can be stored in the inside of a trunk room in a state that the cover device is propped up and supported between inner walls of the trunk room.

Further, it is desirable that the device body is configured to be movable from an upper position which is a use position to a lower position which is a non-use position.

That is, when the automobile body is covered with the body cover, by setting the device body such that the device body can hold the body cover at the upper position, it is possible to position the device close to an operator and hence, the handling is facilitated and, at the same time, at the time of non-use, that is, when the body cover is stored in the trunk room, by moving the device body which is a relatively heavy object downwardly in parallel whereby it is possible to store the device body in a stable state. Accordingly, even when the automobile travels on a rough road, a load applied to the stand portions which support the device body can be suppressed as much as possible and, at the same time, a load applied to the stand portions due to the deadweight of the device per se is decreased thus providing the cover device which exhibits the excellent durability. Further, at the time of non-use, it is possible to ensure the accommodating space in the inside of the trunk room at much as possible.

Further, the above-mentioned device body may be configured to include a drum which winds the body cover thereon and drive means which rotates the drum in the direction to reel out the body cover. The drive means which rotates the drum in the direction to reel out the body cover is, for example, configured such that a reel-out shaft which mounts a resilient body such as a spring thereon is connected to the above-mentioned drum by way of a one-way clutch and, at the same time, energy storage means which rotates the reel-out shaft in the direction opposite to the body cover reel-out direction and deflects the resilient body is provided, and the reel shaft is rotated using a restoring force of the resilient body after manipulating the energy storage means so as to reel out the body cover. Here, there is no particular limitation with respect to the constitution of the energy storage means provided that the energy storing means can deflect the resilient body.

Due to such a constitution, it is possible to semi-automatically and easily perform the reeling out of the body cover with the simple mechanical operation whereby the cover operation can be performed easily. Here, it is needless to say that the reeling out of the body cover may be performed by pulling out the body cover manually.

Further, the drum on which the body cover is wound may be provided with an automatic winding device which winds the reeled-out body cover. Due to such a constitution, in storing the body cover which covers the automobile body, it is possible to automatically wind and store the body cover in the inside of the trunk room by removing the above-mentioned engaging member. It is needless to say that the winding may be the manual winding.

In this embodiment, since the cover device has the above-mentioned constitution. It is possible to easily store and arrange the body cover device in the inside of the trunk room without remodeling the inside of the trunk room or injuring the trunk room and, at the same time, it is possible to easily perform the reeling out and the winding of the body cover. Further, as mentioned previously, since the core members are provided to the body cover, the operations which cover the reel-out operation, the unfolding operation, the folding operation and the storing operation of the body cover can be performed easily.

Here, it is preferable that the above-mentioned resilient support members in the cover device can be supported in a projected manner in the vertical direction.

For example, the stand portion is configured in a telescopic shape and includes an outer sleeve which is mounted upright on a leg seat, a bottomed inner sleeve which is slidably arranged in the inside of the outer sleeve and tiltably mounts the device body thereon, and a rod which is slidably arranged in the inside of the inner sleeve and is provided with a contact member at a distal end thereof, wherein a spring is interposed between a bottom portion of the rod and a bottom portion of the inner sleeve, the inner sleeve can be fixed at a given position, and the rod is biased upwardly from below using the spring.

Due to such a constitution, it is possible to support the cover device at a portion of the trunk room which is most rigid in view of the structure of the trunk room in a prop-up manner and hence, it is possible to store and arrange the cover device in the inside of the trunk room in a stable state. Further, the constitution of the device can be also simplified.

Further, in such a constitution, it is preferable that engaging means is provided between the rod and the inner sleeve and the rod can be engaged with the inner sleeve at a pushed-down position. Due to such a constitution, it is possible to perform the fixing operation of the cover device in the inside of the trunk lid more easily.

Further, it is preferable that the above-mentioned device body is extended between the stand portions such that an opening for reeling out and winding of the body cover formed in the device body faces a gap formed between an edge portion of a distal end of the trunk lid and an edge portion of an opening portion of the trunk room.

To be more specific, the reel-out/winding opening is formed in a cylindrical casing which stores the drum of the device body and, at the same time, the direction of the reel-out/winding opening at a position where the device body is supported in a jerked state is directed toward the gap formed between the edge portion of the distal end of the trunk lid and the edge portion of the opening portion of the trunk room.

Due to such a constitution, the distal end of the body cover can be surely reeled out toward the rear window side from the gap.

Here, the device body can be replaceably mounted on the stand portions. That is, the device body is removed from the stand portions and stored at the time of none-use and is easily mounted on the stand portions at the time of use thus further enhancing the easy-to-use property.

Further, the stand portions may be configured such that a pair of leg seats which extend in the fore-and-aft direction of the trunk room and a pair of support struts which are respectively mounted upright on the distal end sides of the respective leg seats are provided, resilient support members which are respectively formed in an inverse-L-shape and mount contact members on extended distal end portions thereof are formed on upper end portions of both support struts in an extensible manner, and the above-mentioned pair of support struts are arranged on the depth side of the trunk room.

Due to such a constitution, the whole stand portions have an approximately U-shape as viewed from the side and hence, the support struts can be arranged on the depth side of the trunk room whereby it is possible to effectively make use of trunk room as much as possible. Further, even when the automobile is of a type which has a large depth in the trunk room, it is possible to cope with the automobile without damaging the availability of the trunk room and hence, the compatibility of the device body with respect to the mode of the trunk room can be broadly unfolded. Further, since the leg seat is extended from the depth side to the front side, the stability of the device which is supported in a projected manner is increased.

Further, the above-mentioned stand portions may be configured to be turned up side down or to be rotatable about an axis. In this case, it is possible to change the position of the support portions of the device body by rotating the stand portions or lay down the stand portions per se when the cover device is not used whereby it is possible to make more effective use of the space in the inside of the trunk room.

As has been explained heretofore, according to the present invention, it is possible to provide the high-quality body cover which exhibits the extremely favorable operability in the case the automobile is covered with the body cover and in the case the body cover is removed from the automobile and is stored in the trunk room.

Particularly, when the body cover is pulled out from the cover device which is stored in the trunk room and is unfolded, these operations can be performed extremely easily and, at the same time, the folding operation which is performed at the time of storing the body cover can be also facilitated. Further, the winding and storing operations in the inside of the trunk room can be substantially fully automatically performed and hence, the operability is enhanced whereby the operation to cover the automobile body which has been cumbersome conventionally can be extremely easily performed up to the storing of the body cover thus providing the cover device which exhibits the extremely high practical use.

Hereinafter, the automobile body cover (hereinafter referred to as "body cover") A according to the embodiment of the present invention is specifically explained together with the automobile body cover device B provided with the body cover A (hereinafter referred to as "cover device") in conjunction with the drawings.

FIG. 1 is an explanatory view showing a use state of the cover device B provided with the body cover A according to this embodiment. The cover device B is, as shown in the drawing, configured to be used in a state that the cover device B is stored in the inside of the trunk room 10 of an automobile 1. The cover device B is mounted such that the cover device B can reel out and wind the body cover A into the cover device B. In the drawing, numeral 11 indicates a trunk lid, numeral 12 indicates a rear glass of a rear window portion, numeral 13 indicates a rear seat, and numeral 14 indicates a roof portion.

Here, the cover device B which uses the body cover A of the present invention is not always of a type which is arranged in the trunk room 10 as described above. That is, the constitution of the cover device B is not particularly limited.

First of all, the first embodiment of the body cover A which constitutes an essential part of the present invention is specifically explained.

(First Embodiment)

Figure 2:
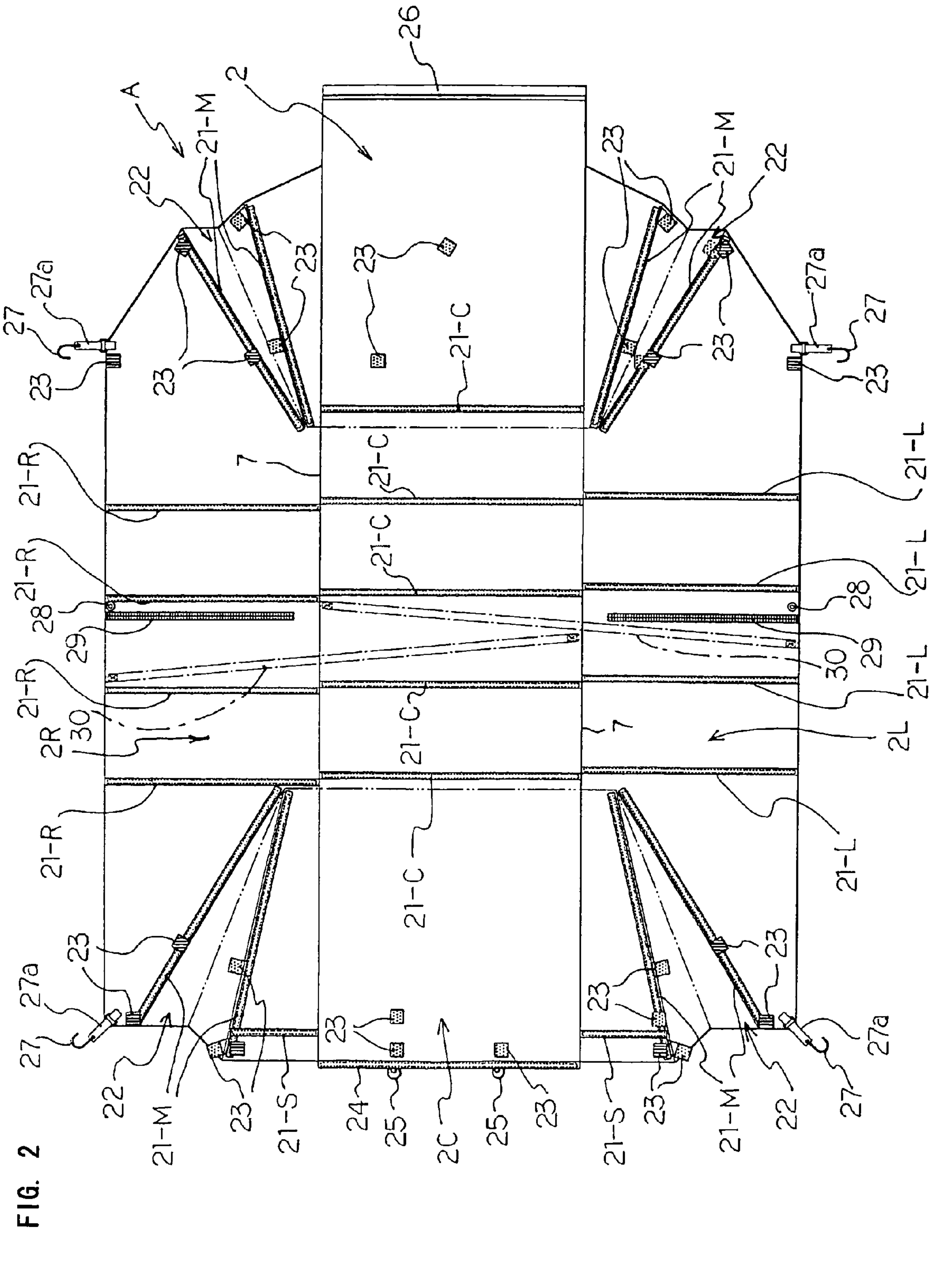
FIG. 2 is an explanatory view showing a state in which the whole body cover is unfolded.
Figure 3:
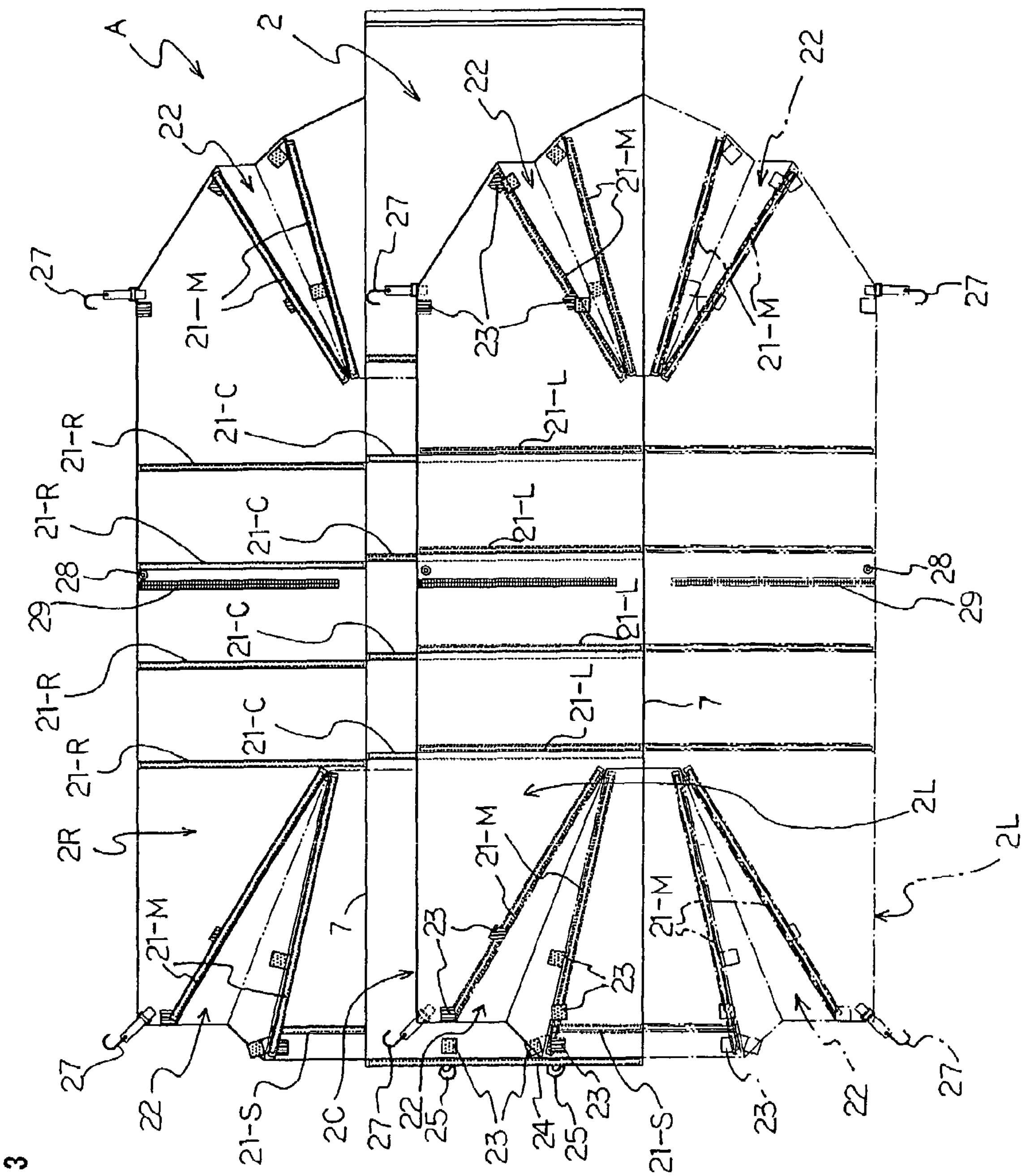
FIG. 3 is an explanatory view showing a state in which one side is folded.
Figure 4:
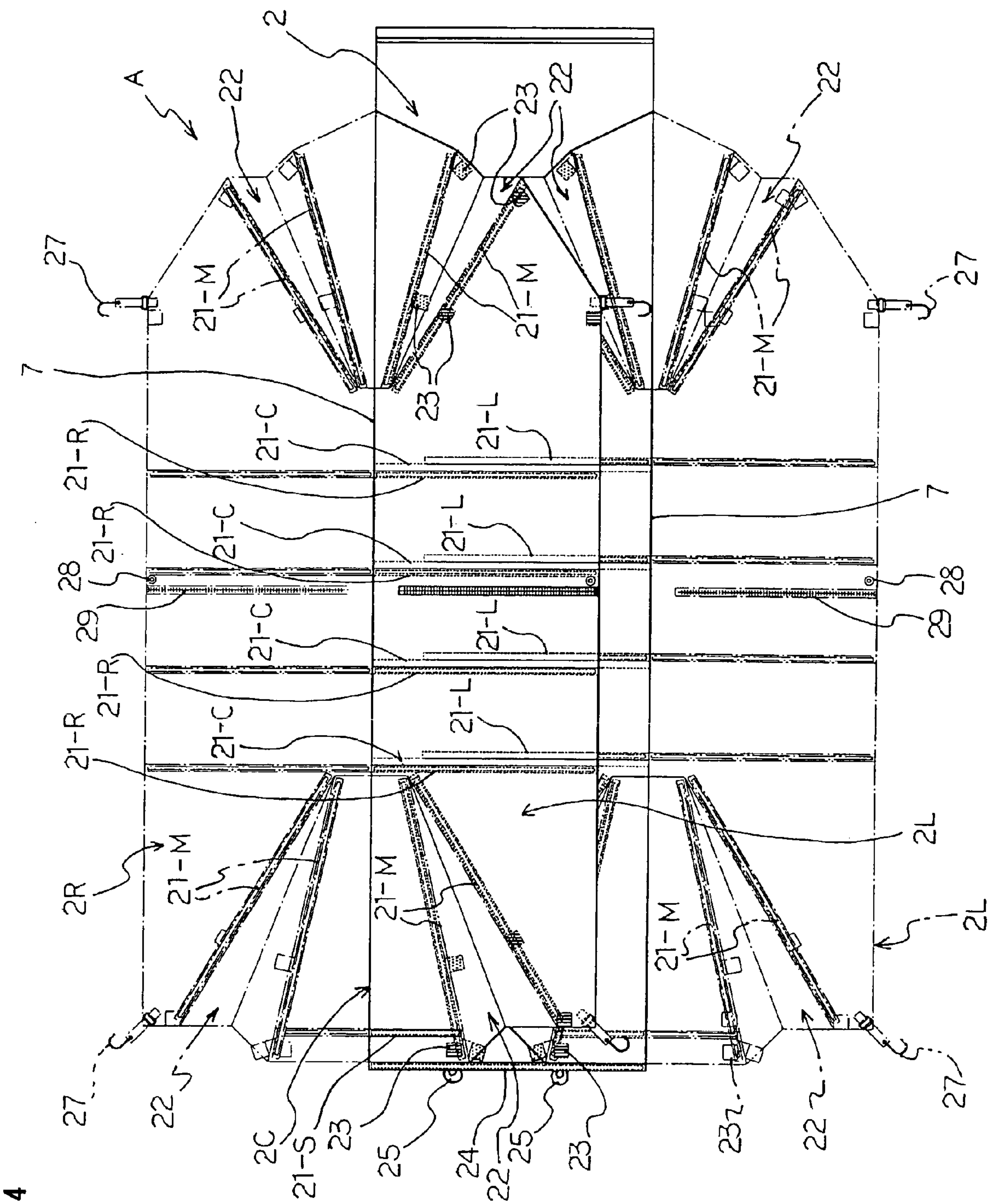
FIG. 4 is an explanatory view showing a state in which the body cover is folded in three.
Figure 5:
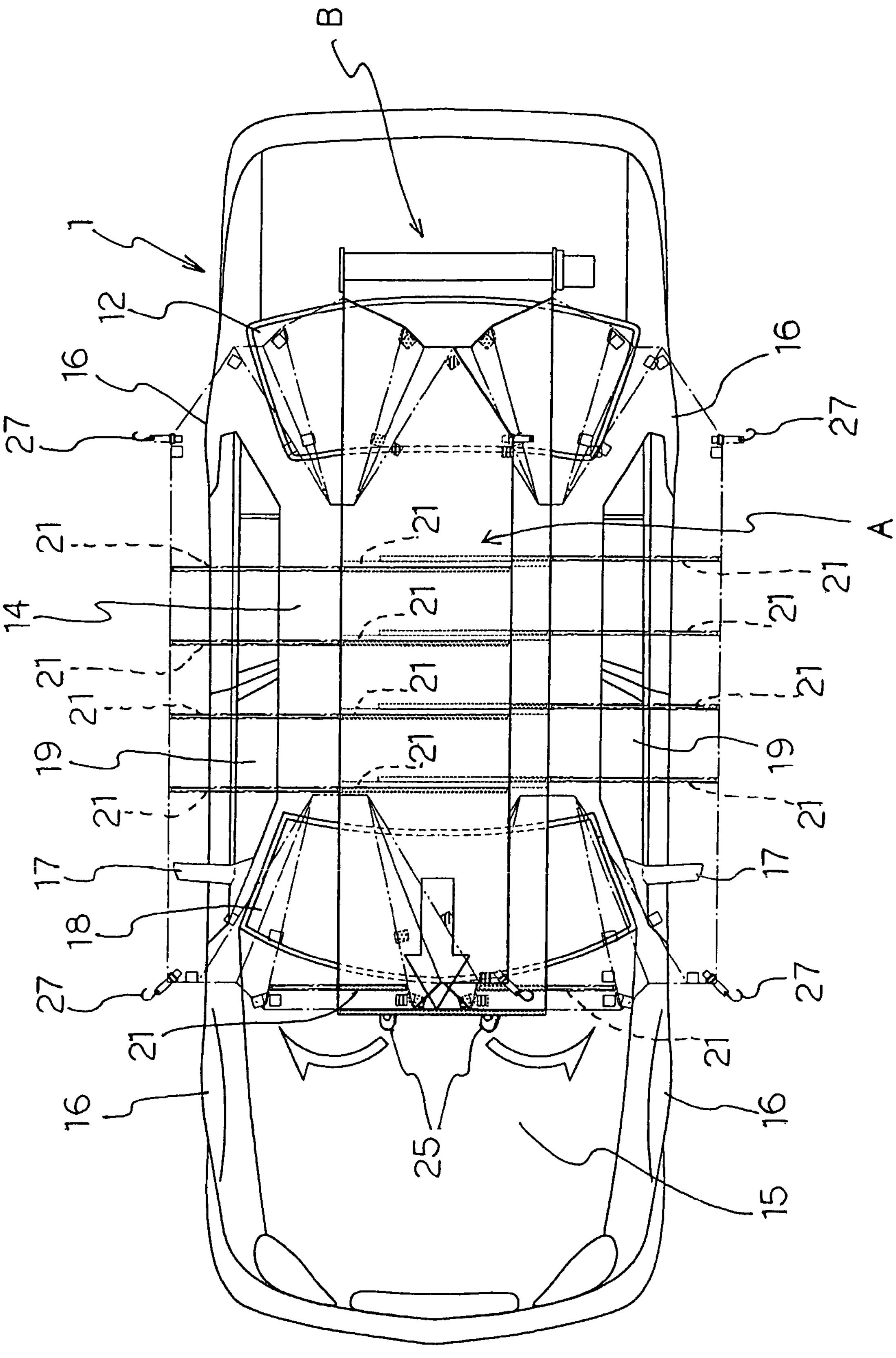
FIG. 5 is an explanatory view showing a state in which the body cover is reeled out to a position above a roof of an automobile.
Figure 6:
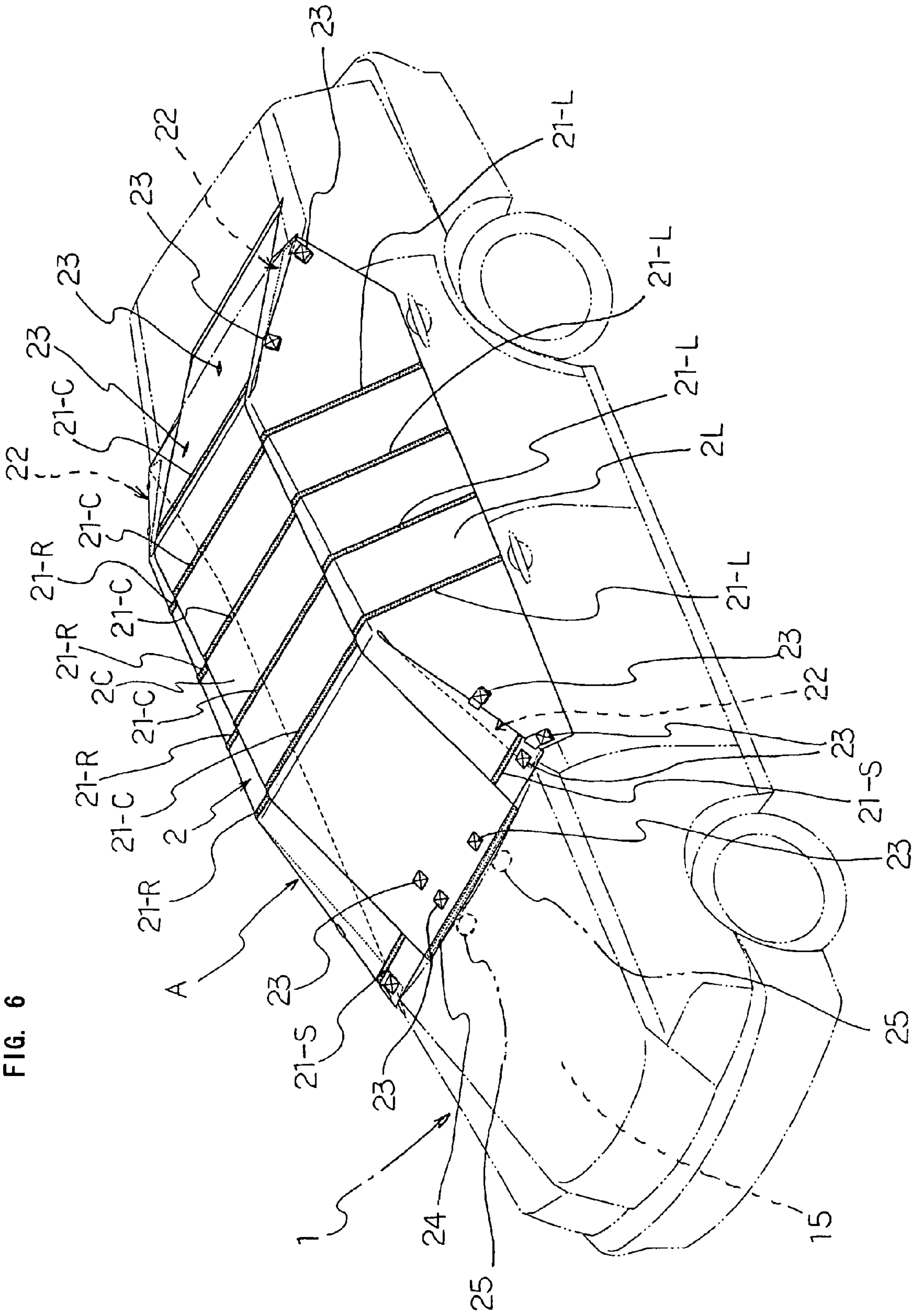
FIG. 6 is an explanatory view showing a state in which the body cover is mounted on an automobile.

FIG. 2 to FIG. 4 are explanatory views of the body cover A as viewed from above, wherein FIG. 2 is the explanatory view showing the whole body cover A in an unfolded state, FIG. 3 is an explanatory view showing the body cover A with one side thereof in a folded state, and FIG. 4 is an explanatory view showing the body cover A folded in three. Further, FIG. 5 is an explanatory view showing a state in which the body cover A is reeled out to a roof portion 14 of the automobile 1, and FIG. 6 is an explanatory view showing a state in which the body cover A is mounted on the automobile 1 according to this embodiment. Here, the automobile 1 of this embodiment is a so-called sedan type which projects a trunk thereof rearwardly.

As shown in FIG. 2, the body cover A of this embodiment is configured such that on a cover body 2 which substantially constitutes the body cover A and is formed in a shape which allows the cover body 2 to cover a roof portion 14 and front, rear, left and right window portions of the automobile 1, a plurality of core members 21 are arranged in parallel to each other at a given interval at positions which cross the reel-out direction and the winding direction of the body cover A.

The cover body 2 uses chemical fibers such as polyester, nylon or the like as a material thereof, uses a material to which SV coating is applied and which exhibits the excellent waterproof and weatherability. Further, the cover body 2 is foldable in three in the longitudinal direction along fold line portions 7 into a center portion 2C which covers the front and rear window portions and a roof portion 14 and a left-side portion 2L and a right-side portion 2R which cover the left and right window portions, and the above-mentioned core members 21(21-L, 21-R, 21-C) are formed on the center portion 2C, the left-side portion 2L and the right-side portion 2R.

As shown in the drawing, two fold line portions 7 are formed in parallel for guiding folding, wherein the substantial fold line portions 7 in the first embodiment constitute seamed portions between the above-mentioned center portion 2C and the left-side portion 2L and the right-side portion 2R in the cover body 2. In short, the center portion 2C and the left-side portion 2L and the right-side portion 2R are not integrally and continuously formed but are formed in a line shape such that the center portion 2C, the left-side portion 2L and the right-side portion 2R are easily folded using the seamed portions as boundaries.

The core members 21 are produced by forming a plate-like spring steel into a strip shape and has a width of 12 mm and a thickness of 0.3 mm. With the use of such spring steel, it is possible to impart a sufficient rigidity to the cover body 2 and, at the same time, there is no possibility that the weight is largely increased. Further, a length of the core members 21 may be suitably changed in conformity with the size of the automobile 1. Still further, the body covers A per se may be prepared in different sizes. With respect to these core members 21, in this embodiment, five core members 21 are mounted on the above-mentioned center portion 2C from the front side at an equal interval and, at the same time, four core members 21 are mounted on the left-side portion 2L and the right-side portion 2R from also the front side at an equal interval respectively.

Here, there mounting positions are offset from each other such that the respective core members 21 are not overlapped to each other when the body cover A is folded in three (see FIG. 4). That is, in this embodiment, the core members 21-R which are respectively mounted on the right-side portion 2R are slightly displaced in the frontward direction with respective to the core members 21-C which are respectively mounted on the center portion 2C, while the core members 21-L which are respectively mounted on the left-side portion 2L are also slightly displaced in the rearward direction with respect to the core members 21-C which are respectively mounted on the center portion 2C, thus offsetting the arrangement positions of the respective core members 21-C, 21-R, 21-L from each other. Accordingly, it is possible to eliminate the possibility that the body cover A folded in three becomes excessively thick thus obstructing the winding operation.

Further, on the left and right-side portions 2L, 2R of the body cover A, also in the vicinity of a front edge portion which is positioned in front of the roof portion 14 of the automobile 1, as core members for the front edge, short core members 21-S which has a length approximately ⅓ of a length of other core members 21 are formed.

In FIG. 2 to FIG. 4, numeral 22 indicates gore portions which are formed for absorbing a gap between a state in which the cover body 2 of the body cover A is unfolded and a state in which the automobile 1 is actually covered with the cover body 2 in a good shape, wherein the gore portions 22 are formed at front and rear sides of left and right-side portions 2L, 2R of the cover body 2.

At the time of fitting the body cover A on the automobile 1 by folding the gore potions 22, to facilitate the folding, core members 21-M are also formed on fold lines of the gore potions 22 which form an approximately V shape and, at the same time, hook-and-loop fasteners 23 which are served for holding the folded shape are provided.

With the provision of the gore portions having such a constitution, it is possible to increase the strength of the folded portions and, at the same time, the automobile 1 and the body cover A fit each other thus enhancing the aesthetic appearance. Here, among these gore portions 22, in the vicinity of the gore portions which are provided at the front side, slits which allow side mirrors 17 to pass through the gore portions 22 may be formed.

Further, the above-mentioned hook-and-loop fasteners 23, 23 . . . 23 are, as showing in the drawing, formed in a rectangular shape and are provided to suitable positions of the cover body 2. The hook-and-loop fasteners 23 are useful not only for holding a favorable cover shape by folding the above-mentioned gore portions 22 at the time of actually covering the automobile 1 with the body cover A but also for maintaining the body cover A in a three-folded state at the time of folding the cover body 2 in three. Since these hook-and-loop fasteners 23 are light-weighted and have a sufficient bonding strength, the hook-and-loop fasteners 23 can be suitably adopted by the cover body 2.

Numeral 24 indicates a pipe-like are bottom bar which is formed on a distal-end edge of the center portion 2C and is provided for ensuring the smooth movement of the cover body 2 in a stable state while preventing the turning of the cover body 2 at the time of reeling-out the cover body 2.

The bottom bar 24 is provided with suction cups 25 as temporary fixing means. These suction cups 25 are available with respect to a point that by temporarily fixing the cover body 2 to the bonnet 15 at the time of reeling out the body cover A, it is possible to prevent the body cover A from slipping down due to wind. Here, although two suction cups 25 are provided in this embodiment, one suction cup 25 may be provided at an approximately center position of the bottom bar 24.

Numeral 26 indicates a drum connecting portion which is formed on a rear end edge of the center portion 2C positioned opposite to the above-mentioned bottom bar 24. A hook-and-loop fasteners or a line fastener or the like can be used as the drum connecting portion. The drum connecting portion 26 can be replaceably mounted on a drum of a device body 3 of in the cover device B described later. Accordingly, it is possible to easily perform the exchange of only the body cover A.

Numeral 27 indicates hooks which are provided to front and rear sides at the left and right-side portions 2L, 2R of the cover body 2 by way of connecting strings 27*a* formed of rubber or the like which is elongated and shrunken in the fore-and-aft direction of the left and right-side portions 2L, 2R of the cover body 2. The hooks 27 can be mounted on fenders 16 or the like of the automobile 1 when the body cover A is mounted on the automobile 1. Further, although not showing in the drawing, pocket portions are formed on the cover body 2 for storing the hook portions 27 at the time of folding the cover body 2 to prevent the hook portions 27 from impeding the folding operation.

Figure 7:
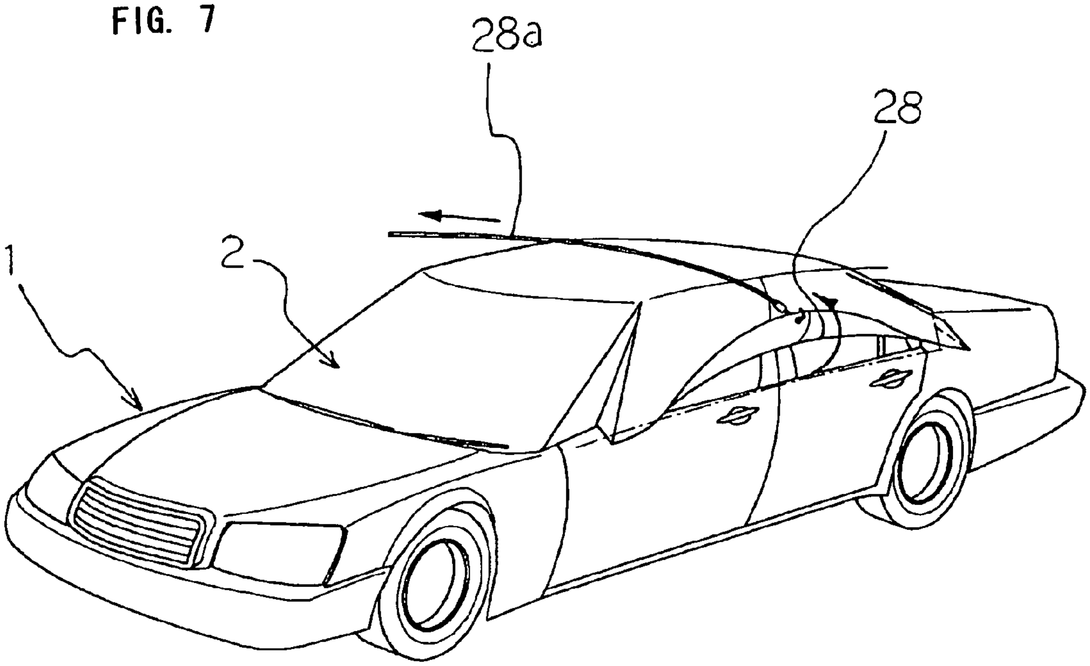
FIG. 7 is an explanatory view showing a use state of a winding rope.

Numeral 28 indicates engaging holes which are formed in center portions of end edges of the left and right-side portions 2L, 2R of the cover body 2. As shown in FIG. 7, using a winding rope 28*a* which is provided with a hook on distal ends thereof, it is possible to easily pull up one of the left and right-side portions 2L, 2R of the cover body 2 from the side opposite to the winding side.

Here, in place of using such a winding rope 28*a*, for example, as indicated by an imaginary line (chain line) in FIG. 2, sheet pull-up belts 30 may be respectively extended between the end edge portions of the left and right-side portions 2L, 2R of the cover body 2 and the vicinities of the end portions of the center portion 2C which constitute boundaries with side portions (2L, 2R) opposite the end peripheral portions of the left and right-side portions 2L, 2R.

Due to such a constitution, an operator can easily pull up the left and right-side portions 2L, 2R of the cover body 2 onto the roof portion 14 without requiring the operator to shift himself to the opposite side and without using the above-mentioned winding rope28*a*.

Figure 8:
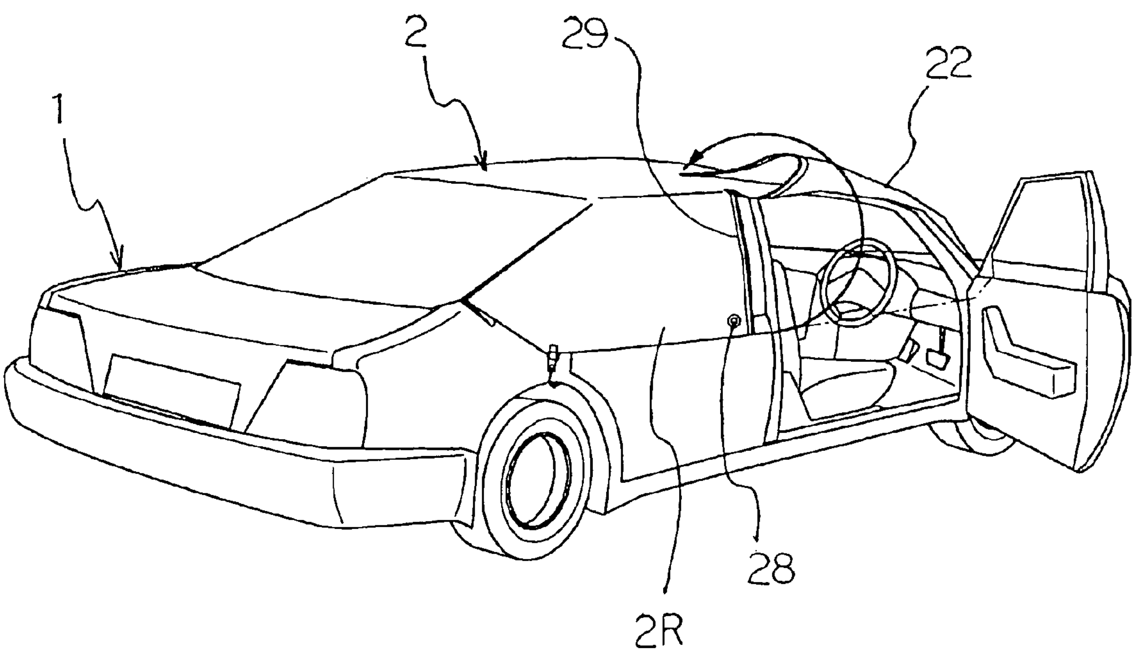
FIG. 8 is an explanatory view showing a case in which left and right-side portions of the cover body are pulled up in a state that the left and right-side portions are divided.

Further, numeral 29 indicates line fasteners which are formed on approximately center portions at end edges of the left and right-side portions 2L, 2R of the cover body 2. The line fasteners 29 can divide each one of the left and right-side portions 2L, 2R of the cover body 2 into the front side and the rear side and, at the same time, the line fasteners 29 are formed on the divided portions thus enabling the folding of the front side and the folding of the rear side separately on the roof portion 14 when necessary as shown in FIG. 8. Accordingly, even when the wind is strong, since the left and right-side portions 2L, 2R are divided into small areas, it is possible to easily perform the folding operation without being strongly influenced by the resistance of the wind.

The body cover A according to this embodiment has the above-mentioned constitution and a case in which the body cover A is actually unfolded and folded is explained in conjunction with FIG. 3 to FIG. 6.

In this embodiment, in folding the body cover A in three to store the body cover A mounted on the automobile 1, the folding is started from the left-side portion 2L. As shown in FIG. 3, first of all, the left-side portion 2L is jerked. Here, due to the provision of the fold line portion 7, by performing the jerking operation while holding a front portion of the left-side portion 2L, it is possible to smoothly fold back the left-side portion 2L ranging from the front portion to the rear portion. Then, by bonding the hook-and-loop fasteners 23 which are formed at given positions together, the left-side portion 2L is overlapped to the center portion 2C such that the positional displacement is not generated. Next, the right-side portion 2R is jerked in the same manner. Also in this case, by bonding the hook-and-loop fasteners 23 which are formed at given positions together, the right-side portion 2R is overlapped to the center portion 2C and the left-side portion 2L such that the positional displacement is not generated (FIG. 4). In this case, as mentioned previously, the hooks 27 may be stored in the pocket portions. Alternatively, the above-mentioned winding rope 28*a* may be used, the line fastener 29 is opened so as to separate each one of the left and right-side portions 2L, 2R into the front side and the rear side and, thereafter, the front side and the rear side are separately jerked, or when the body cover device includes the sheet pull-up belts 30, the sheet pull-up belts 30 may be used.

Then, when the body cover A which is folded in three is slightly pulled in the frontward direction, the body cover A is automatically wound by the winding means which is mounted on the cover device B. Also in this case, since the core members 21 are formed on the body cover A, the body cover A is smoothly wound without collapsing the shape thereof.

With respect to the unfolding of the body cover A for mounting the body cover A on the automobile 1, the unfolding operation is performed in accordance of steps opposite to the above-mentioned steps as shown in FIG. 5. That is, the body cover A is reeled out in a three-fold state to the roof portion 14 of the automobile 1 from the cover device B. The suction cups 25 formed on the bottom bar 24 are adhered to the bonnet 15 to temporarily fix the body cover A and the whole body cover A is held in a stable state. The hook-and-loop fasteners 23 are separated from each other and the right-side portion 2R of the cover body 2 is jerked sideward. In the same manner, the left-side portion 2L of the cover body 2 is jerked sideward. Also in this case, since the core members 21 are formed on the fold line portions 7, 7 and the left and right-side portions 2L, 2R, it is possible to manipulate the respective left and right-side portions 2L, 2R as a whole thus realizing the extremely easy handling of the body cover A.

Then, when the unfolding of the cover body 2 is finished, the shape is arranged by folding gore portions 22 and a good shape is held by the hook-and-loop fasteners 23. Then, the hooks 27 (omitted in FIG. 6) are engaged with the fenders 16 so as to allow the cover body 2 to firmly cover the front, rear, left and right windows (front glass, rear glass, left and right side glasses) 18, 12, 19, 19 and the roof portion 14 as shown in FIG. 6.

In this manner, it is possible to surely cover the front, rear, left and right windows 18, 12, 19, 19 and the roof portion 14 by forming the cover body 2 in a compact size of minimum necessity. Accordingly, it is possible to prevent the inside of the automobile 1 from elevating to the high temperature by a solar heat in summer season and can prevent freezing of windows and fallen snow in winter season. Further, since the cover body 2 can cover the automobile 1 in a state that the cover body 2 fits the automobile 1, the cover body 2 exhibits the good appearance.

Figure 9:
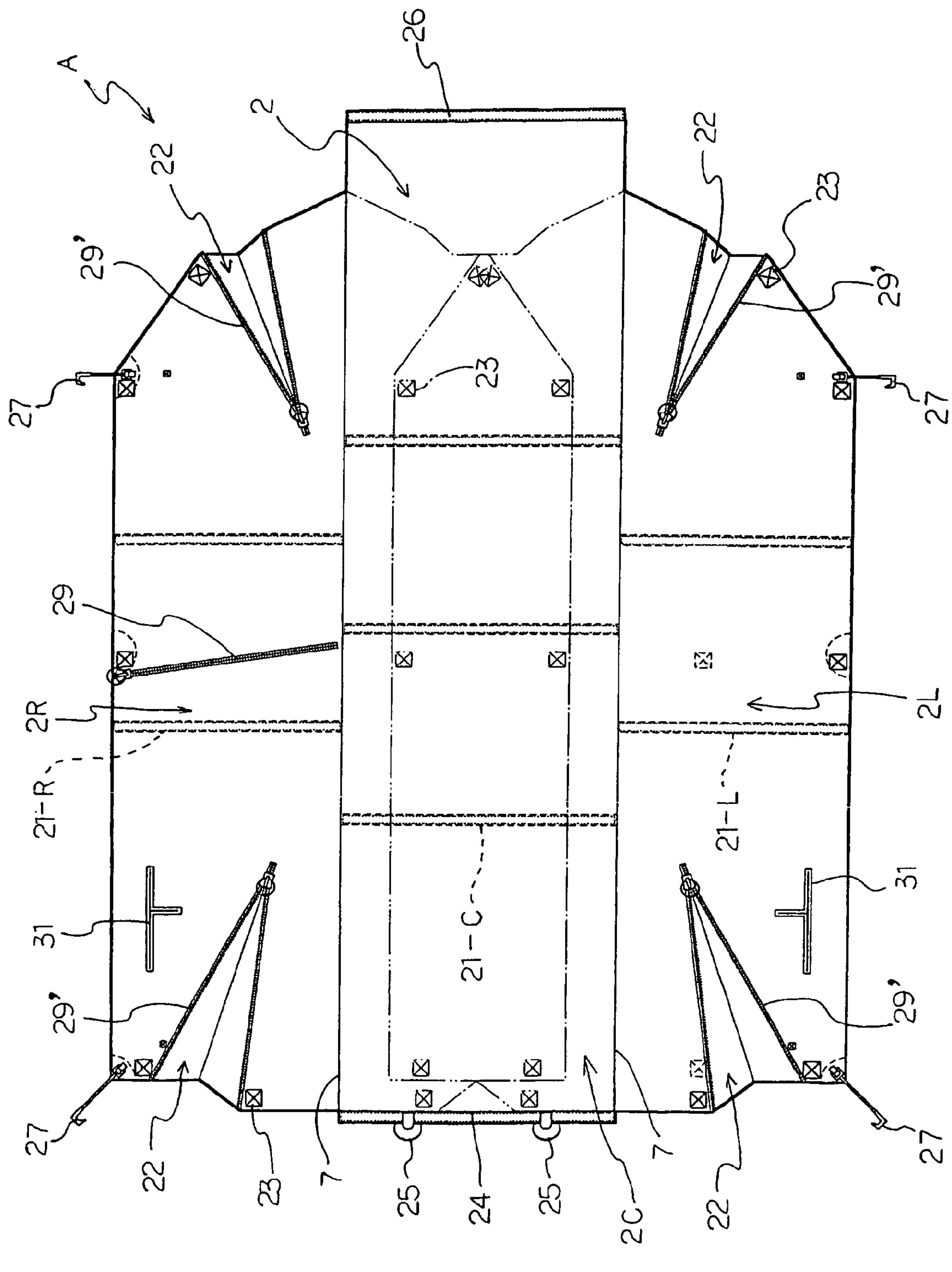
FIG. 9 is an explanatory view of a body cover provided with gore fasteners.
Figure 10:
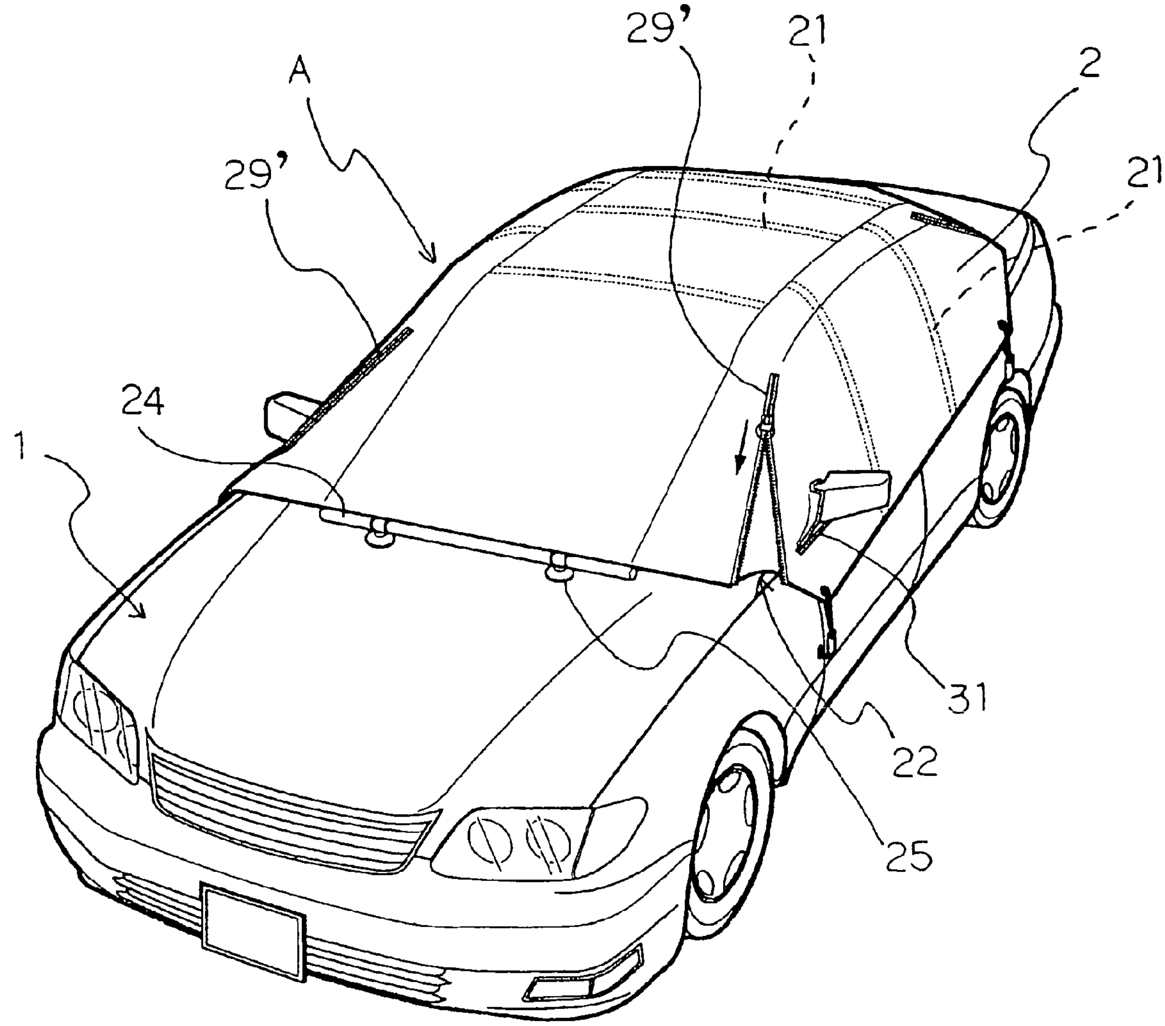
FIG. 10 is an explanatory view showing a use state of the body cover provided with the gore fasteners.

Next, as a modification of the above-mentioned body cover A, a body cover A shown in FIG. 9 and FIG. 10 is explained.

This body cover A is characterized in that gore line fasteners 29' are provided at positions where the core members 21-M are formed on the folds of the above-mentioned gore portions 22. Here, numeral 31 in the drawing indicates door mirror slits. Since other constitutions are substantially equal to the constitutions explained heretofore, their explanation is omitted.

By providing the gore line fasteners 29' as shown in this modification, the gore portions 22 are neatly arranged and hence, as shown in FIG. 10, it is possible to fit the body cover A on the automobile 1 easily and in good appearance.

Further, in this modification, while three core members 21 are mounted on the above-mentioned center portion 2C at an equal interval from the front side and, at the same time, two core members 21 are mounted on the left-side portion 2L and the right-side portion 2R respectively.

As has been explained above, the body cover A of this embodiment can prevent the collapse of shape at the time of reeling out or winding the body cover A and hence, the body cover A can remarkably enhance the operability with respect to a series of operations to cover the automobile 1.

Figure 11:
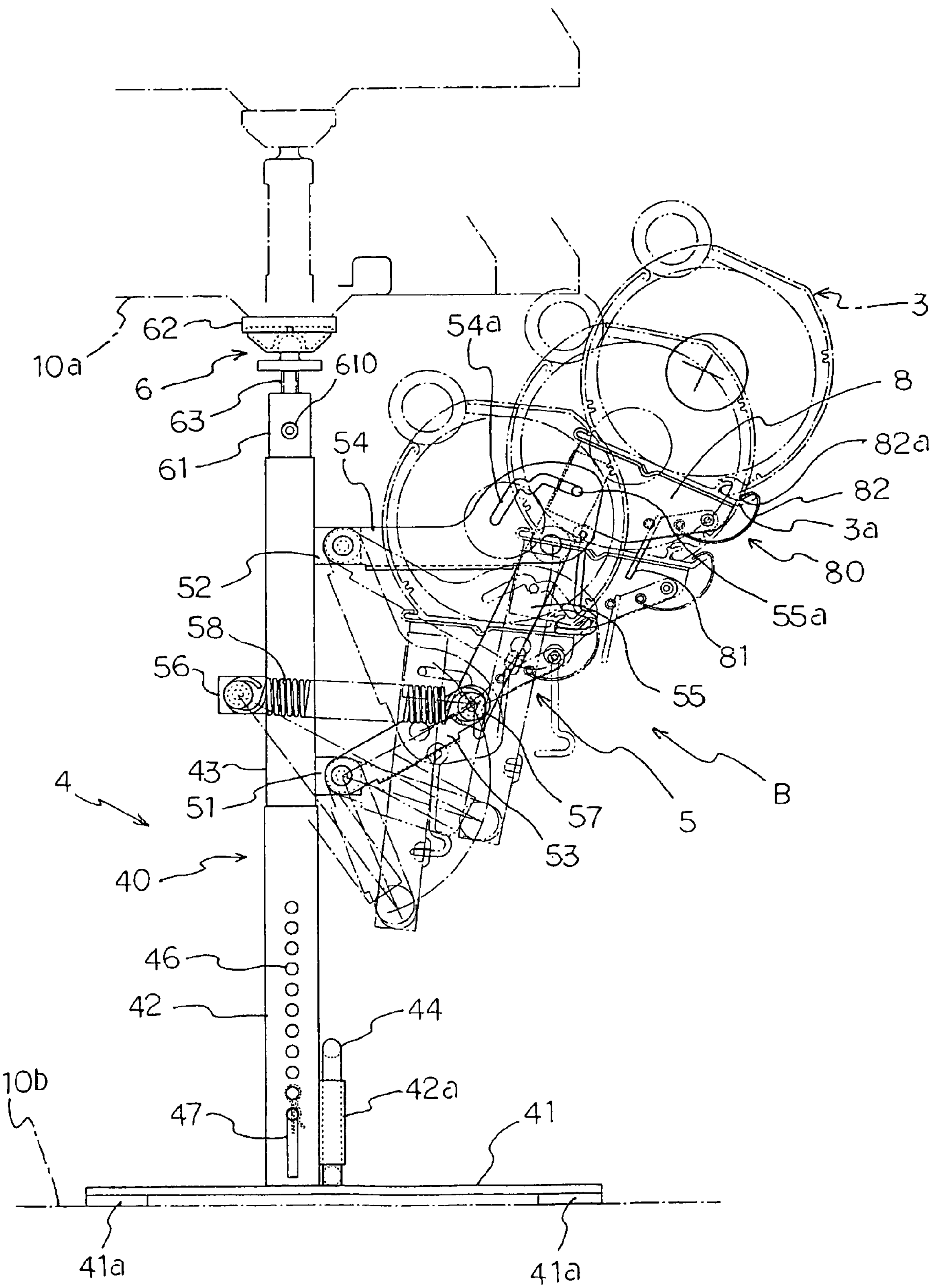
FIG. 11 is an explanatory view of a cover device as viewed from the side.

Next, the cover device B is explained in conjunction with FIG. 1 and FIG. 11 which is an explanatory view of the cover device B as viewed from the side.

The cover device B includes a device body 3 which is configured to reel out and wind the above-mentioned body cover A and a stand portion 4 which mounts the device body 3 by way of a link mechanism 5 thereon. A resilient support member 6 is mounted on the stand portion 4 in a prop-up manner and the cover device B can be housed in the inside of the above-mentioned trunk room 10 in a state that the cover device B is supported in a prop-up manner between inner walls of the trunk room 10 by way of the resilient support member 6. Further, the above-mentioned device body 3 is configured to be movable obliquely and in parallel from an upper position which is a use position to a lower position which is a non-use position.

In this embodiment, the above-mentioned resilient support member 6 can be supported in a prop-up manner in the vertical direction and, as shown in FIG. 11, can be interposed between a ceiling wall 10*a* and a bottom wall 10*b* which constitute inner walls of the trunk room 10.

The stand portion 4 which contiguously mounts the device body 3 thereon is constituted of a pair of support struts 40, 40 with a given distance therebetween and each support strut 40 is configured as follows. That is, an outer sleeve 42 is mounted upright on the vicinity of one end side of an elongated-plate-like leg seat 41 which laminates a buffer material 41*a* such as rubber on a lower surface thereof. The buffer material 41*a* also functions as a slip stopper. A bottomed inner sleeve 43 is slidably fitted into the inside of the outer sleeve 42. A rod 61 which forms a female thread portion at the center thereof is slidably fitted into the inside of the inner sleeve 43. Further, a coil spring (see FIG. 12 and FIG. 14 though being omitted in FIG. 11) which biases the rod 61 is arranged between a bottom portion of the rod 61 and the inner sleeve 43.

Further, a threaded rod 63 for adjusting a projection length which tiltably and pivotally mounts a contact member 62 on a distal end thereof is threadedly engaged with the female thread portion of the rod 61.

In this manner, the resilient support member 6 is constituted of the rod 61, the contact member 62 and the threaded rod 63 including the above-mentioned coil spring and is served for interposing the cover device B between the ceiling wall 10*a* and the bottom wall 10*b* of the trunk room 10.

Further, small sleeve bodies 42*a* are respectively contiguously formed on lower sides of peripheral surfaces of the respective outer sleeves 42 and a connection rod 44 which has both ends thereof bent is extended between the small sleeve bodies 42*a* so as to stabilize the left and right support struts 40, 40.

Further, in this embodiment, as described above, the device body 3 is mounted on the stand portion 4 by way of the link mechanism 5. Further, the device body 3 is configured to be replaceable.

The link mechanism 5 is configured as follows. That is, a lower bracket 51 and an upper bracket 52 are respectively mounted on a lower portion and an upper portion of the inner sleeve 43 of the stand portion 4, a proximal end of the lower arm 53 is pivotally connected to the lower bracket 51, a proximal end of an upper arm 54 having a stopper is pivotally connected to the upper bracket 52, and distal ends of the both arms 53, 54 are pivotally connected to each other by way of a connection link arm 55.

Then, between the upper and lower brackets 52, 51, a spring support fitting 56 is provided to the above-mentioned inner cylinder 43, while the spring support fitting 56 and a pivotally connecting portion 57 which is formed between the lower arm 53 and the connection link arm 55 are connected by a link coil spring 58.

Further, in a distal end portion of the above-mentioned upper arm 54 having the stopper, a regulation groove 54*a* having an approximately M shape, for example, which constitutes displacement regulation means is formed, and a pin 55*a* which is formed on the connecting link arm 55 is engaged with the regulation groove 54*a*.

Due to such a constitution, as indicated by a solid line and a chain line shown in FIG. 11, with the action of the link mechanism 5, the device body 3 is approximately moved in parallel in the rear downward direction from the use position and is stored. On the other hand, in positioning the device body 3 at the uppermost position which constitutes the use position, the body cover A can be easily reeled out through a gap 11*b* defined between a proximal end 11*a* of the trunk lid 11 and the rear glass 12, while when the device body 3 is not used, by moving the device body 3 approximately in parallel in the rear downward direction from the posture in the use state, the device body 3 can be stored in the inside of the trunk room 10 without being brought into contact with the trunk lid 11 and in a state that the inside of the trunk room 10 is effectively used (see FIG. 1).

That is, when the cover device B is not used, it is possible to make use of a lower space in the inside of the trunk room 10 widely and other luggage can be easily stored even in a state that the cover device B of this embodiment is stored in the inside of the trunk room 10.

Here, as mentioned previously, the device body 3 is replaceably mounted on the stand portion 4. To explain this constitution, as shown in FIG. 11, a device body mounting portion 8 is formed on a distal end of the connection link arm 55 and lock means 80 which fixes the device body 3 is mounted on the device body mounting portion 8.

The lock means 80 is constituted by mounting an approximately arcuate lock spring 82 made of spring steel on a toggle-type lever 81 formed in an approximately L shape, wherein an engaging portion 82*a* formed on a distal end of the lock spring 82 is engageable with a lock peripheral portion 3*a* formed on a bottom portion at the device body 3 side whereby the device body 3 can be easily mounted on the device body mounting portion 8 with a snap fitting. Since the lock means 80 is mounted on an opening portion side of the trunk room 10, the operability is also enhanced.

Further, the cover device B of this embodiment can perform the height adjustment of the stand portion 4 by fixing the outer sleeve 42 and the inner sleeve 43 using a pin as a stopper.

That is, a large number of positioning through holes 46 are formed in the outer sleeve 42 at a small interval, the inner sleeve 43 is slidably moved in the inside of the outer sleeve 42, a stopper pin 47 is inserted into the above-mentioned positioning through holes 46 at a position where the stand portion 4 assumes a proper height thus restricting the height position of the inner sleeve 43. Here, the proper height of the stand portion 4 means a height which allows the coil spring stored in the inside of the inner sleeve 43 to sufficiently bias the rod 61 upwardly and the contact member 62 is supported in the inside of the trunk room 10 in a prop-up manner.

Next, to briefly explain the internal structure of the device body 3, although omitted from the drawing, the device body 3 includes a drum which winds the body cover A and winding means which winds the body cover A on the drum. As the winding means, any mechanism such as a mechanical mechanism, an electric mechanism or the like can be adopted. The type can be suitably decided in view of the weight, the size, the cost and the like. In this embodiment, the mechanical constitution which returns the drum by making use of a restoring force of the spring is adopted.

Here, the first to third modifications of the cover device B are explained in conjunction with FIG. 12 to FIG. 17. Here, with respect to symbols used in these modifications, with respect to constitutional elements which are identical with those explained in conjunction with FIG. 11, the same symbols are used. Numeral 400 indicates a coil spring which is omitted in FIG. 11.

Particularly, the first modification and the second modification shown in FIG. 12 to FIG. 15 are characterized by the constitution of the stand portion 4. The stand portion 4 has the basic constitution which includes a pair of leg seats 41 extending in the fore-and-aft direction of the trunk room 10 and a pair of support struts 40, 40 which are respectively mounted on both leg seats 41, 41 upright in the same manner as the stand portion 4. Here, however, the above-mentioned pair of support struts 40, 40 are mounted upright in the vicinities of proximal ends of the elongated-plate-like leg seats 41 and, at the same time, the resilient support members 6' are formed in an inversed L shape and are mounted on upper end portions of the above-mentioned respective left and right support struts 40. Then, contact members 62 are formed on the extended distal end portions of the resilient support members 6'.

Due to such a constitution, it is possible to arrange the pair of support struts 40, 40 at the deepest position of the trunk room 10 and hence, the trunk room 10 can be effectively used as much as possible.

Figure 12:
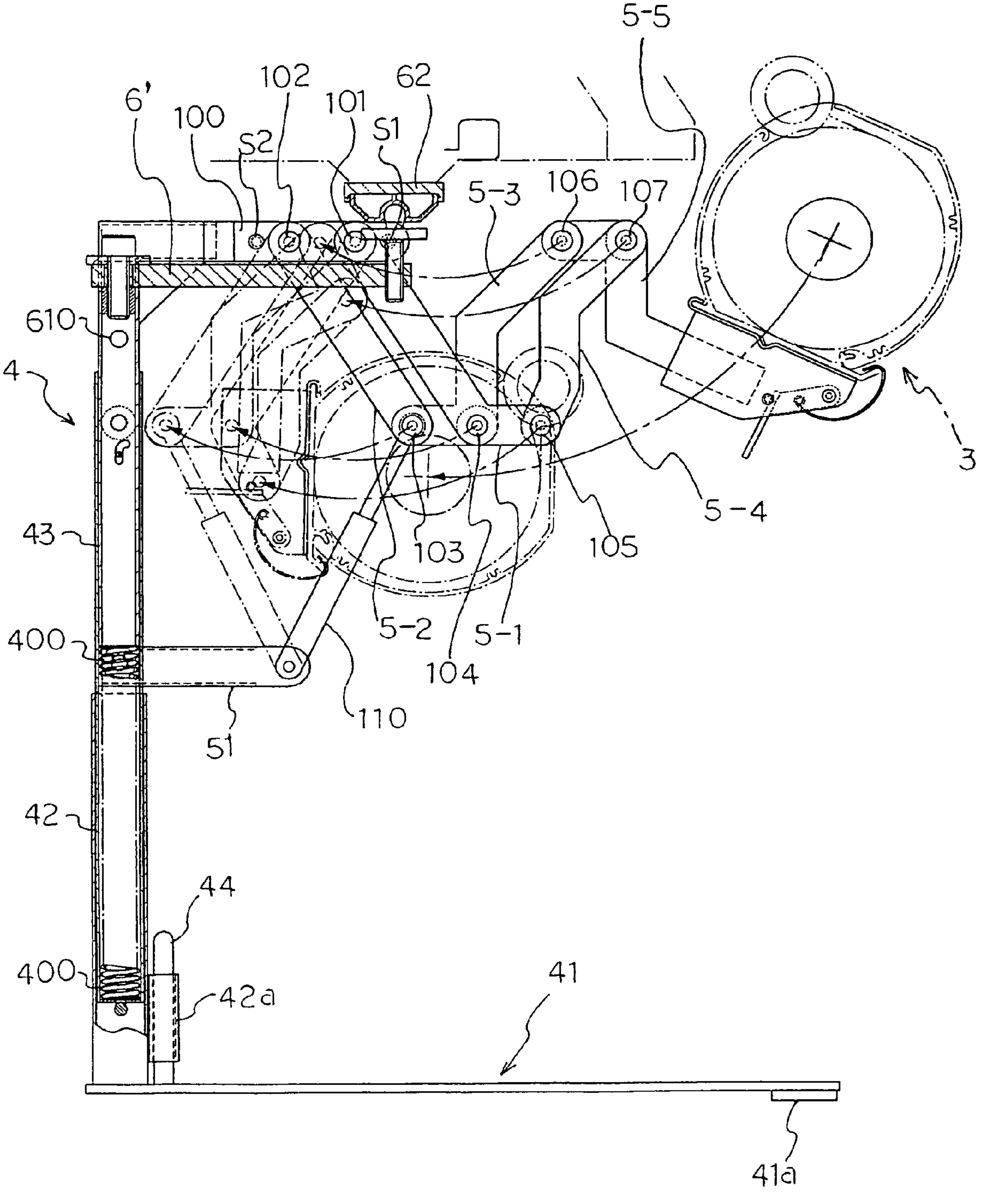
FIG. 12 is an explanatory view of the first modification of a stand portion as viewed from the side.
Figure 13:
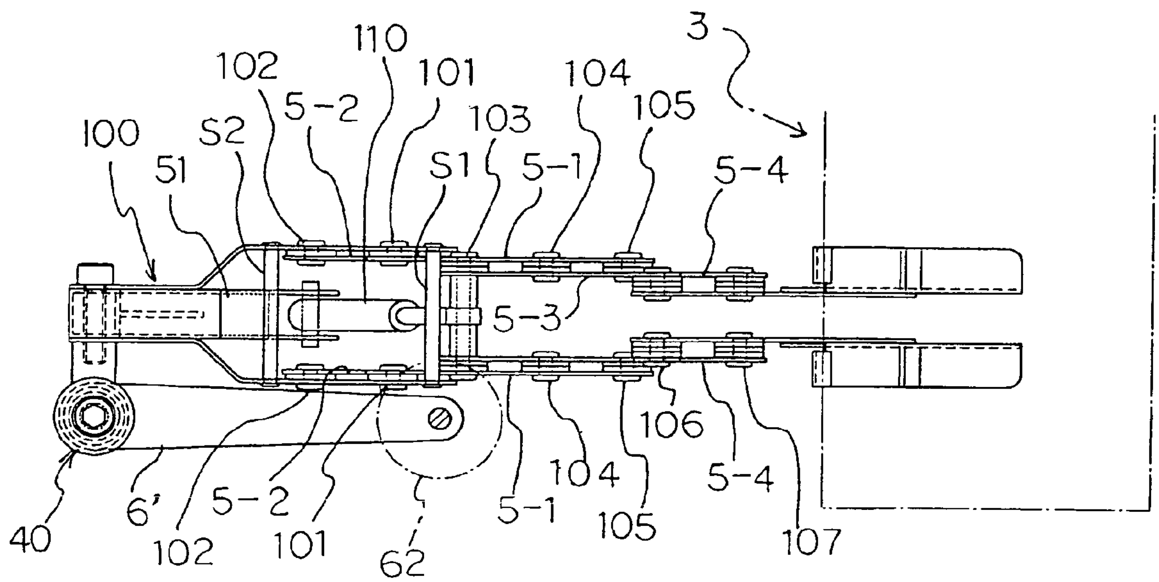
FIG. 13 is an explanatory view of the first modification of the stand portion as viewed from above.

The link mechanism 5 which supports the device body 3 in the cover device B according to the first modification shown in FIG. 12 and FIG. 13 adopts a five-link system and is configured such that it is sufficient for an operator only to pull the device body 3 in the frontward direction in use.

That is, on the inner side of the inversely-L-shaped resilient support member 6', a fork-shaped hinge base member 100 is arranged approximately parallel to the resilient support member 6' and, at the same time, on left and right distal end portions of the hinge base member 100, proximal end portions of a pair of first links 5-1, 5-1 which are respectively formed in an inversely L-shaped shape are mounted by way of a first pivot shaft 101. Further, a second pivot shaft 102 is provided to a portion of the hinge base member 100 slightly behind the first pivot shaft 101 and second links 5-2, 5-2 are connected by way of the second pivot shaft 102. Further, respective distal end portions of the second link 5-2 and the first link 5-1 are pivotally connected to a proximal end side of the third link 5-3 with a fixed distance therebetween. Numeral 103, 104 indicate third and fourth pivot shafts.

The third pivot shaft 103 penetrates the second link 5-2 and the third link 5-3 and a distal end of a spring stay 110 which incorporates a compression coil spring (not shown in the drawing) is rotatably connected to the third pivot shaft 103. Here, a proximal end of the spring stay 110 is pivotally supported on a lower bracket 51 of the support strut 40.

Further, to a top distal end portion of the first link 5-1 which is formed in an inversely L shape, a proximal end of a fourth link 5-4 is connected by way of a fifth pivot shaft 105. Further, a distal end portion of the fourth link 5-4 and a distal end portion of the third link 5-3 are pivotally connected to a proximal end side of the fifth link 5-5 with a fixed distance therebetween. Numerals 106, 107 indicate sixth and seventh pivot shafts.

Then, the device body 3 is mounted on a distal end of the fifth link 5-5.

First and second stoppers S1, S2 are formed on the hinge base member 100 and a movable range of the link mechanism 5 as a whole is restricted by allowing the first link 5-1 and the second link 5-2 to come into contact with the first and second stoppers S1, S2 and the position of the device body 3 at the time of use and the position of the device body 3 at the time of non-use can be determined corresponding to the restriction positions.

Due to such a constitution, in the course of the operation to pull the device body 3 in the direction toward the operator, the spring stay 110 performs an operation to push the device body 3 upwardly and hence, the device body 3 can be pulled out easily with a magnified force. Further, due to an action of the link mechanism 5, a rotational locus of the device body 3 does not draw a large arc upwardly as well as downwardly and hence, it is possible to smoothly perform the pull-out operation and the push-in operation of the device body 3 in the inside of the trunk room 10.

Figure 14:
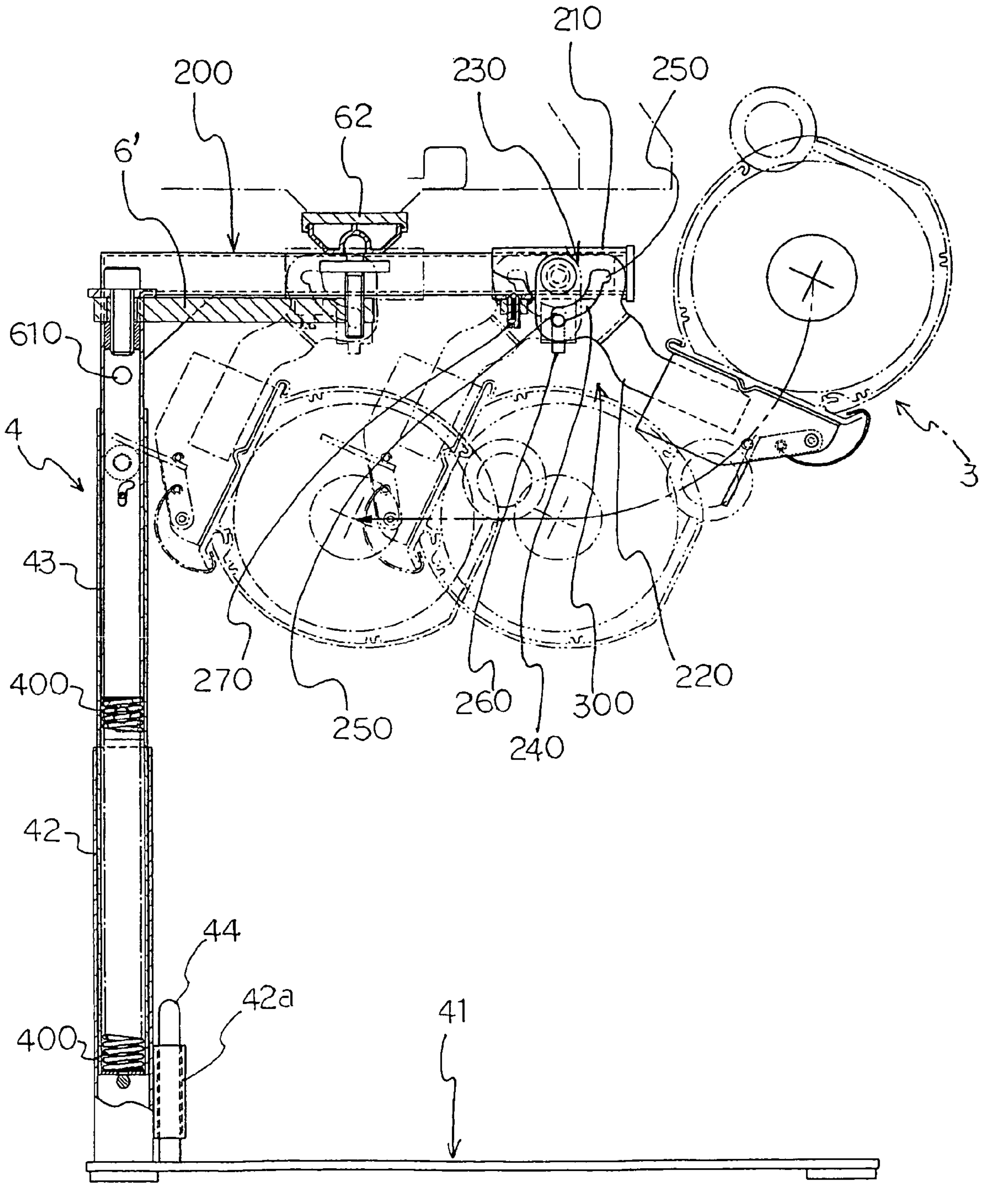
FIG. 14 is an explanatory view of the second modification of the stand portion as viewed from the side.
Figure 15:
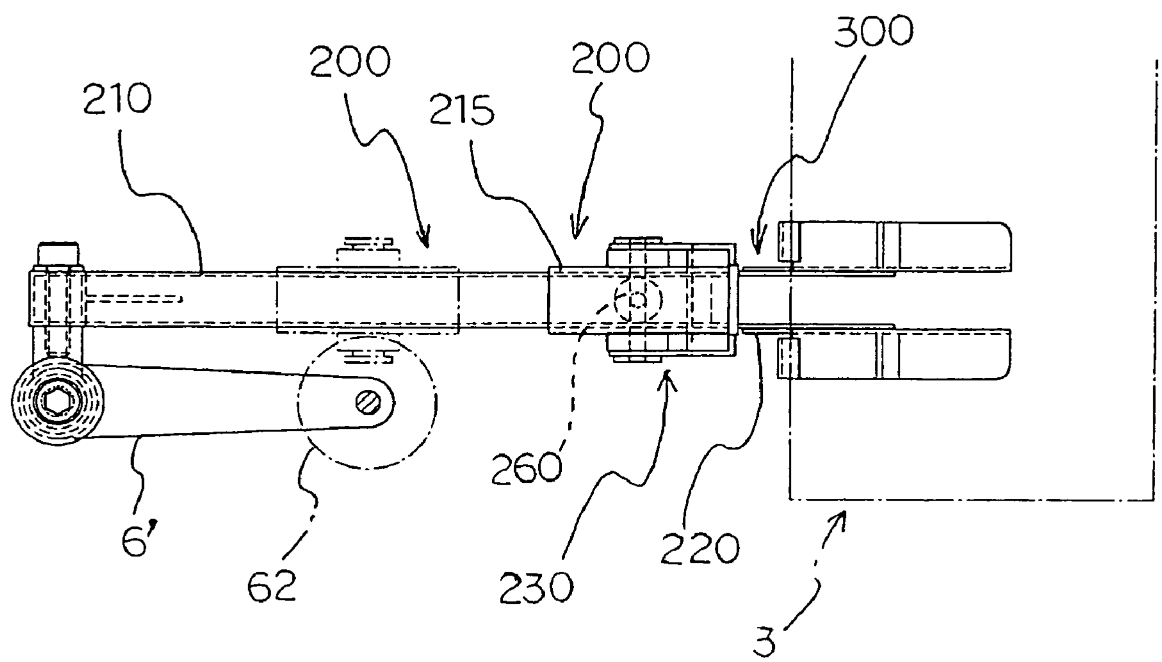
FIG. 15 is an explanatory view of the second modification of the stand portion as viewed from above.

Further, to explain the stand portion 4 according to the second modification shown in FIG. 14 and FIG. 15, this modification also has the same constitution as the first modification. That is, a pair of support struts 40, 40 are mounted upright in the vicinities of proximal ends of the elongated-plate-like leg seats 41 and, at the same time, the resilient support members 6' are formed in an inversed L-shape and are mounted on upper end portions of the above-mentioned respective left and right support struts 40 in an extensible manner, and a contact member 62 is mounted on an extended distal end portion of the resilient support members 6'. However, while the first modification movably supports the device body 3 using the five-link-method link mechanism 5, this modification supports the device body 3 using the combination of a slide mechanism 200 and a tilting mechanism 300.

That is, at the inner side of the inversely L-shaped resilient support members 6', a guide rail 210 is arranged approximately parallel to the resilient support members 6', Further, a slide body 215 is slidably mounted on the guide rail 210, a tiltable arm 220 is tiltably mounted on the slide body 215 and the device body 3 is mounted on the tiltable arm 220.

On a proximal end portion of the tiltable arm 220 which substantially constitutes a tilting mechanism 300, a tilting restriction portion 230 is mounted. The tilting restriction portion 230 is formed in a U-shaped cross-sectional shape and is mounted on left and right side surface portions of the slide body 215 such that the tilting restriction portion 230 strides over the slide body 215 from below. Then, guide grooves 240 are formed in left and right side surfaces of the tilting restriction portion 230 and, at the same time, in recessed portions 250, 250 formed in a distal end and a terminal end of groove 240, an approximately T-shaped fixing pin 260 which is vertically movably arranged on a lower portion of the slide body 215 falls and is held.

Accordingly, when the fixing pin 260 is pushed upwardly and is disengaged from the recessed portions 250, the fixing pin 260 is guided by guide grooves 240 and hence, the device body 3 is tiltable in the fore-and-aft direction between the use position and the non-use position.

Further, a ball plunger 270 is mounted on a lower surface portion of the slide body 215 to hold the device body 3 in a stable manner at the use position and the non-use position.

Due to such a constitution, by pulling out the device body 3 toward the user from the non-use position by way of the slide body 215, by rotating the device body 3 upwardly together with the tiltable arm 220 by manipulating the above-mentioned fixing pin 260, and by making the fixing pin 260 fall in the recessed portions 250 and holding the fallen pin 260 in the recessed portions 250, it is possible to support the device body 3 at the given use position in a stable manner. The case that the device body 3 is returned from the use position to the non-use position is performed in reverse steps.

Figure 16:
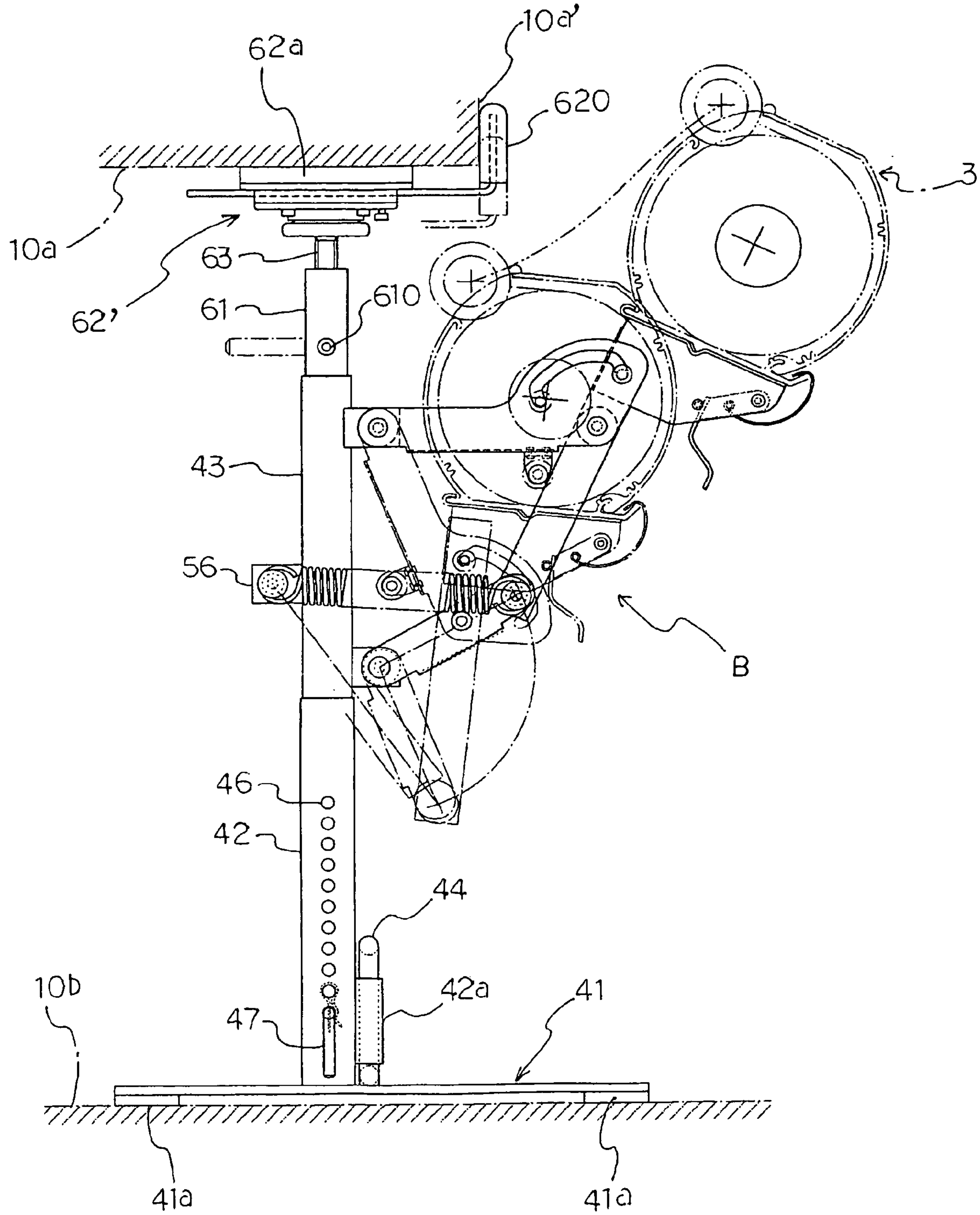
FIG. 16 is an explanatory view of the third modification of the stand portion as viewed from the side.
Figure 17:
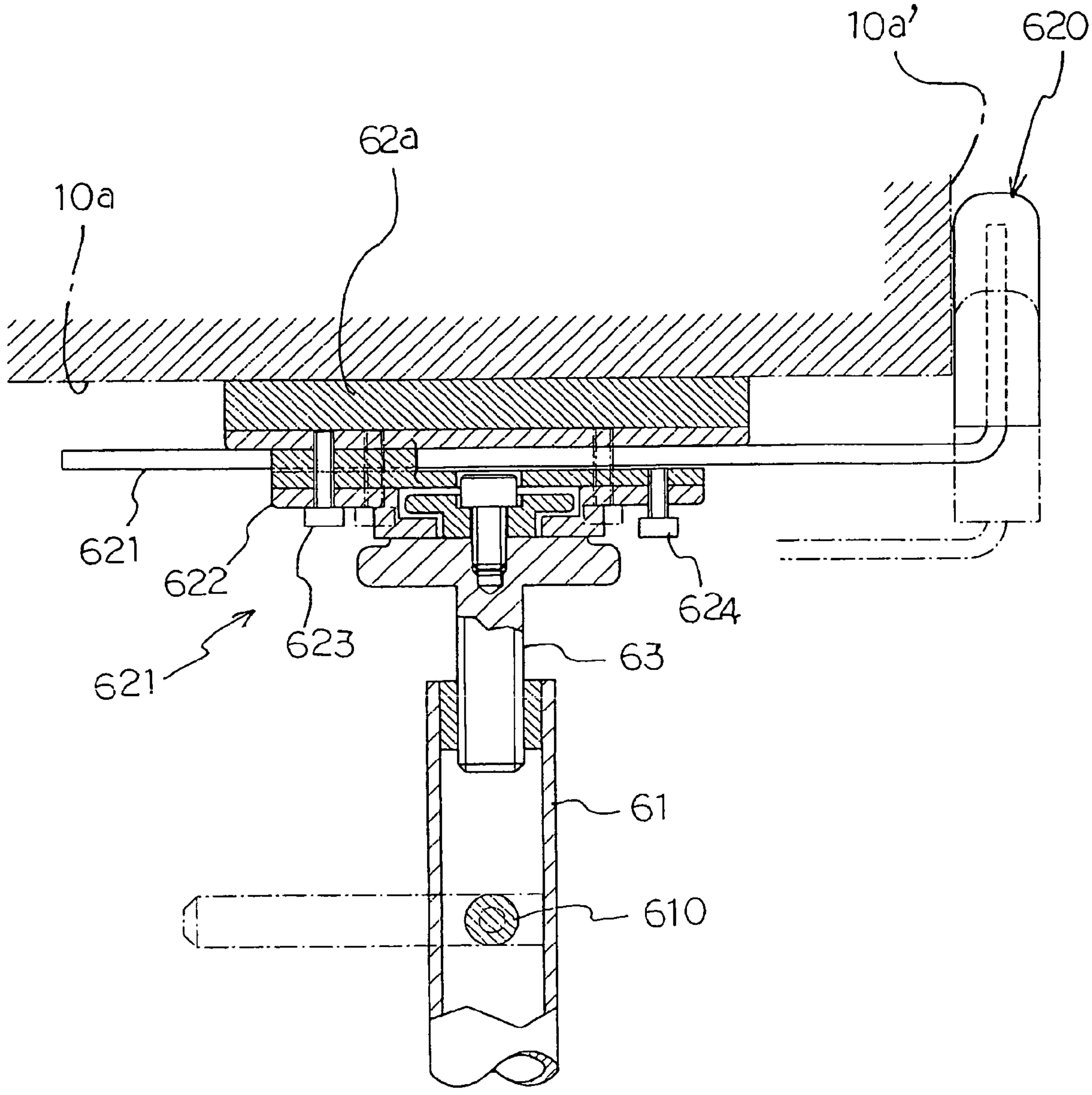
FIG. 17 is an enlarged explanatory view showing the constitution of an engaging member which constitutes an essential part of the third modification of the stand portion.

Next, a modification of a contact member 62' which constitutes a portion of the resilient support members 6 is explained in conjunction with FIG. 16 and FIG. 17. Here, the constitutions other than the structure of the contact member 62' are substantially equal to the constitutions which are explained in conjunction with FIG. 11.

The contact member 62' of this modification is characterized in that the contact member 62' is provided with an engaging member 620 which is engaged with an end portion **10*a*' of a ceiling wall 10*a* of the trunk room 10. The engaging member 620 is mounted on a lower portion of a pad portion 62*a* which is directly brought into contact with the ceiling wall 10*a* such that the engaging member 620** is slidable and can be fixed.

In FIG. 17, numeral 621 indicates a slide member which is contiguously formed with the engaging member 620. The slide member 621 is slidably inserted into the inside of a gap formed between a press member 622 which is arranged on a lower portion of the pad portion **62*a* and a lower surface of the pad portion 62*a*. Numeral 623 indicates a fixing bolt for mounting the press member 622 on the pad portion 62***a* and numeral 624 indicates a positioning bolt for fixing the slide member 621 at an arbitrary position.

Due to the above-mentioned constitution, even when a sudden impact in the fore-and-aft direction is applied to the cover device B in a state that the cover device B is stored and arranged in the inside of the trunk room 10, since the engaging member 620 is firmly engaged with the end portion 10*a*' of the ceiling wall 10 of the trunk room 10, the possibility that the cover device B jumps toward a front portion of the trunk room 10 against the supporting of the cover device B by the vertical prop-up of the cover device B can be eliminated thus enhancing the safety of the cover device B.

Hereinafter, steps in which the cover device B according to this embodiment including the above-mentioned modifications is actually arranged in the trunk room 10 of the automobile 1, the body cover A according to this embodiment is reeled out, the body cover A covers the automobile body, and the body cover A is removed and is stored in the inside of the trunk room 10 are explained. Here, it is assumed that, at an initial point of time, the device body 3 assumes a state in which the device body 3 is removed from the stand portion 4.

First of all, the trunk lid 11 is opened, the stand portion 4 is mounted between the ceiling wall 10*a* and the bottom wall 10*b* of a depth portion which is formed of a relatively rigid frame in the inside of the trunk room 10, the inner sleeve 43 is set to a suitable height so as to bring the contact member 62 into contact with the ceiling wall 10*a* and, at the same time, a length of the threaded rod 63 is adjusted to support the cover device B with a suitable jerking force. Here, with the use of a lever 610 which is mounted on the rod 61 in an projecting manner (see FIG. 11 to FIG. 17), the manipulation can be performed easily.

Then, the device body 3 is locked using the lock means 80 after mounting and, thereafter, the device body 3 is pulled upwardly. At such a position, the bottom bar 24 of the body cover A faces the gap 11*b* defined between the proximal end portion 11*a* of the trunk lid 11 and the rear glass 12. That is, the device body 3 is set such that the reeled-out body cover A can advance along the rear glass 12.

Next, the bottom bar 24 of the body cover A is gripped and pulled out. The body cover A is made to pass on to the roof portion 14 through the gap 11*b* along the rear glass 12. The bottom bars 24 is positioned to the lower and front end of the front glass 18 and, thereafter, the suction cup 25 is made to suck the bonnet 15 thus temporarily fixing the body cover A.

In this embodiment, with respect to the reeled-out body cover A, the right-side portion 2R of the cover body 2 is overlapped at the uppermost position. Accordingly, the hook-and-loop fastener 23 for temporary fixing is removed and the right-side portion 2R is jerked and unfolded in the sideward direction and, thereafter, the left-side portion 2L is jerked and unfolded in the sideward direction. Here, the core members 21 which feature the present invention are formed on the left and right-side portions 2L, 2R and hence, it is possible to unfold the left-side and right-side portions 2L, 2R with a single jerking operation respectively whereby the handling of the body cover A becomes extremely easy.

Then, after unfolding the cover body 2, the gore portions 22 are folded to neatly arrange the shape of the cover body 2, wherein it is possible to easily fit the cover body 2 on the automobile 1 by neatly arranging the cover body 2 using the hook-and-loop fasteners 23 or closing the gore line fasteners 29' with respect to the cover body 2 provided with the gore line fasteners 29'. Finally, the hooks 27 are engaged with the fenders 16 thus completing the covering operation.

Next, to wind the body cover A into the inside of the trunk room 10, the hooks 27 are removed and are respectively stored in given pockets formed on the cover body 2. First of all, the left-side portion 2L is jerked upwardly and is overlapped to the center portion 2C such that the hook-and-loop fasteners 23 which are provided at given positions are connected to each other to prevent the positional displacement of the left-side portion 2L. Here, in place of storing the hooks 27 in the pockets, hook-and-loop fasteners may be provided at positions close to the pockets and hooks 27 may be simply mounted on the hook-and-loop fasteners. In this case, corresponding hook-and-loop fasteners are provided also to the hook 27 side.

Subsequently, the right-side portion 2R is jerked upwardly and is also overlapped to the center portion 2C and the left-side portion 2L such that the hook-and-loop fasteners 23 which are provided at given positions are connected to each other to prevent the positional displacement of the right-side portion 2R. In performing the jerking operation, as mentioned previously, it is possible to use the winding ropes 28*a*, the line fastener 29 or sheet pull-up belts 30.

Thereafter, the suction cups of the bottom bar 24 are removed from the bonnet 15. By slightly pulling the body cover A which is folded in three in the frontward direction while gripping the bottom bar 24, the winding means mounted on the cover body B is operated so that the body cover A is automatically wound in the inside of the device body 3 arranged in the inside of the trunk room 10.

Here, since the core members 21 are formed on the cover body 2, the cover body 2 is smoothly wound without collapsing the shape thereof. Finally, the trunk lid 11 is closed.

With respect to such a winding operation and the previously-mentioned covering operation, the manipulation is extremely simple and hence, the respective operation can be finished within two to four minutes.

As has been explained heretofore, according to this embodiment, it is possible to easily store and arrange the cover device B in the inside of the trunk room 10 without remodeling or injuring the inside of the trunk room 10 and, at the same time, it is possible to perform the reeling-out and the winding of the body cover A.

(Second Embodiment)

Figure 26A:
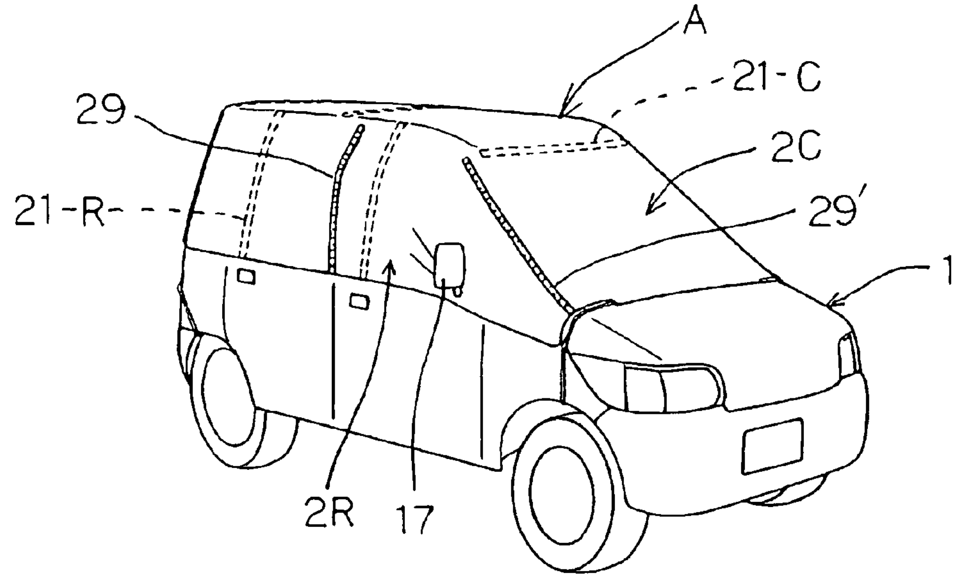
FIG. 26 is an explanatory view showing a state in which the body cover is mounted on an automobile.
Figure 26B:
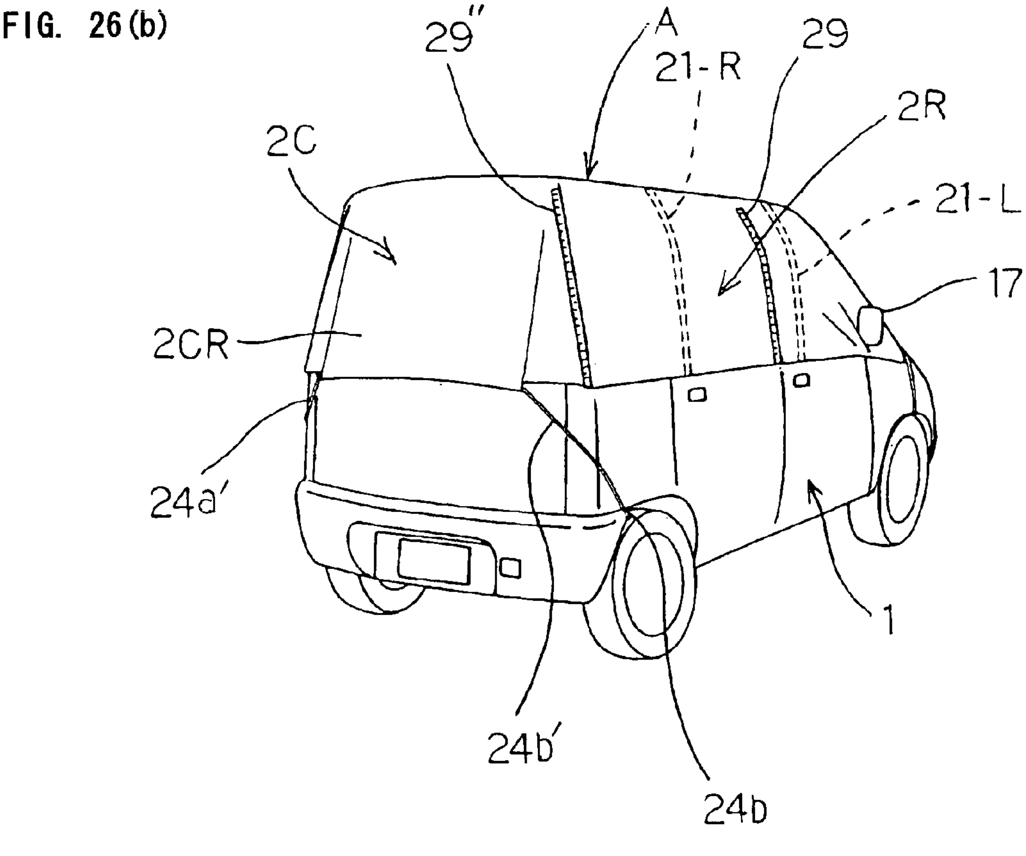

A body cover A according to the second embodiment is explained in conjunction with FIG. 18 to FIG. 26. The body cover A of this embodiment has, as shown in FIG. 26, a shape which is suitable for a so-called wagon-type automobile with a truck which is not projected rearwardly. Further, the body cover A can be extremely easily used in a single form without using a cover device B. Here, with respect to symbols used in the drawing, same symbols which are used in the first embodiments are used to indicate the identical constitutional elements.

Figure 18:
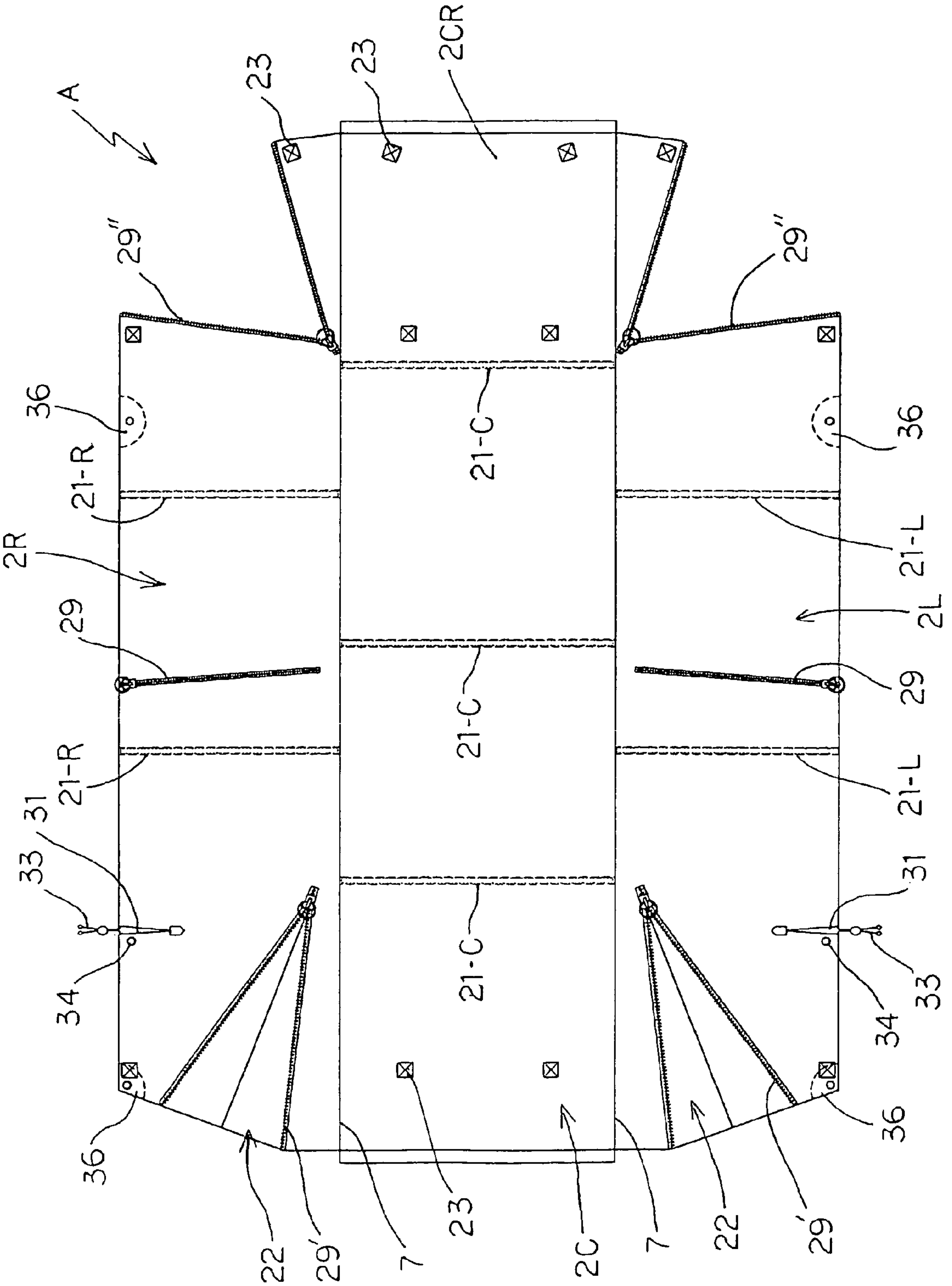
FIG. 18 is an explanatory view showing an unfolded state in which the whole body cover according to the second embodiment is unfolded.

As shown in FIG. 18, the body cover A according to this embodiment has the substantially same basic constitution as the above-mentioned modification (see FIG. 9) of the first embodiment, while gore line fasteners 29' are formed on gore portions 22 and, at the same time, reinforcing portions 36 are formed in the vicinity of the gore portions 22.

Further, a vertically downwardly extending portion 2CR which extends substantially vertically downwardly is formed on a rear portion of the cover body 2 and the vertically downwardly extending portion 2CR and left and right-side portions 2L, 2R are connected to each other by the line fasteners 29". Due to such a constitution, it is possible to cover the wagon-type automobile with the cover body 2 in a state the cover body 2 is snugly fitted on a rear portion of the automobile.

Figure 19:
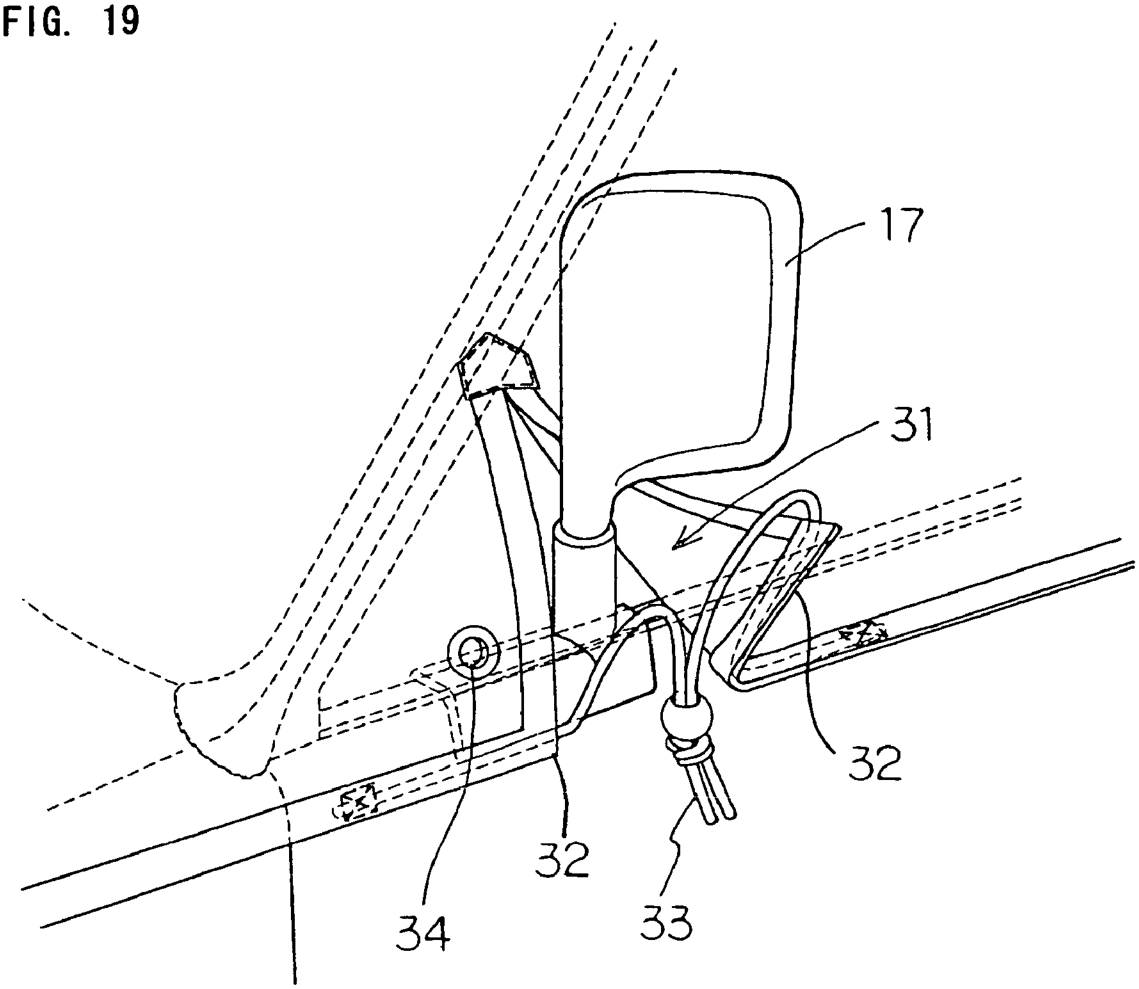
FIG. 19 is an explanatory view showing a state in which a side mirror is made to pass through a slit formed in the body cover.
Figure 20:
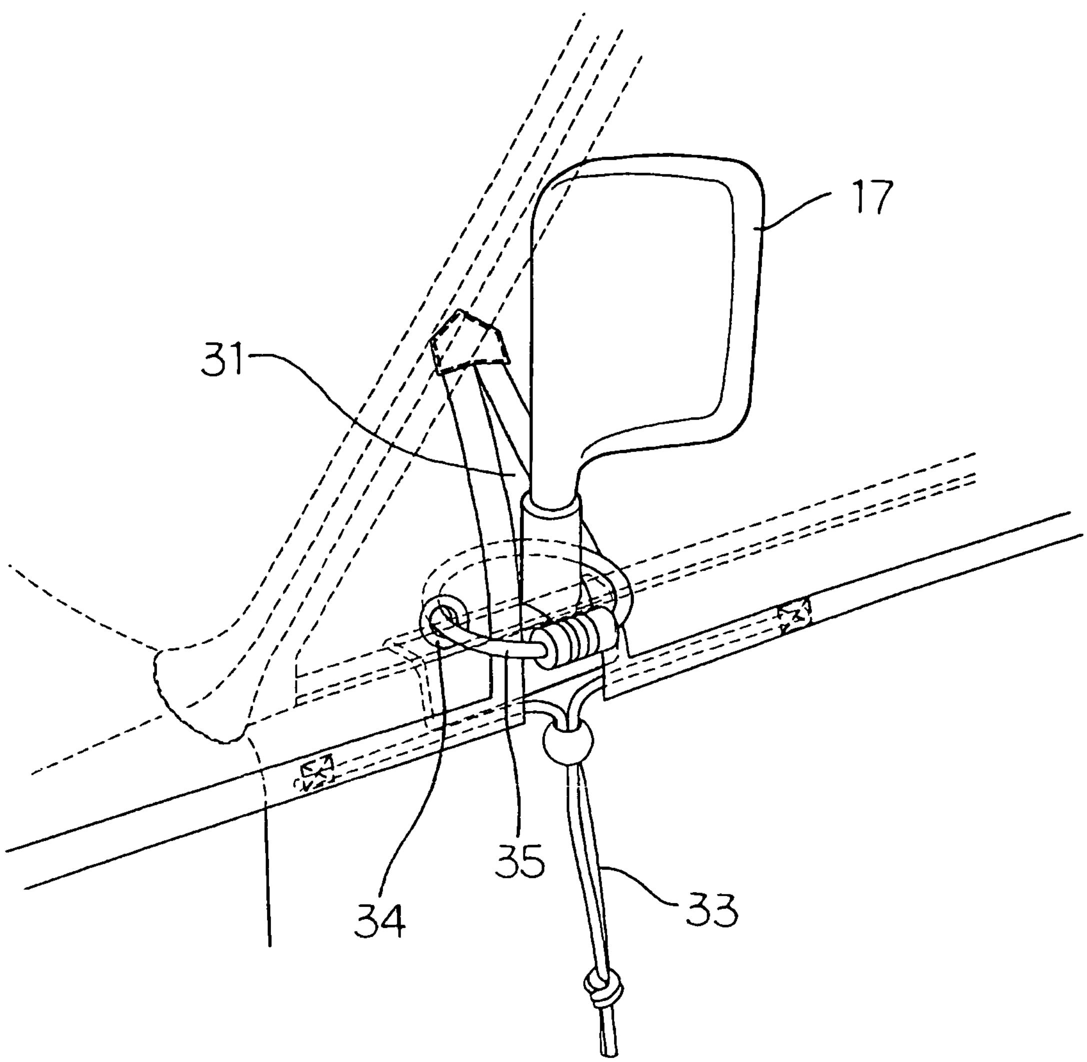
FIG. 20 is an explanatory view showing a locked state of the body cover.

Slits 31 for side mirrors (door mirrors) 17 in this embodiment are cut to end edges of the left and right-side portions 2L, 2R. As shown in FIG. 19 and FIG. 20, after the side mirror 17 is allowed to pass through the slit 31, slit skirt portions 32 can be connected to each other using strings 33. Further, the cover body 2 can be locked by engaging a ring-shaped lock 35 with a ring through hole 34 formed on one side of the slit 31. Accordingly, it is possible to prevent a theft of the body cover A. Although a so-called number lock is used as a lock portion of the ring-like lock 35 in this embodiment, any lock can be used so long as the lock performs a locking function.

The body cover A of this embodiment can, as explained previously, be used in a single form without using the cover device B and the actual manner of using the body cover A is specifically explained hereinafter in conjunction with FIG. 21 to FIG. 25. Here, the explanation is made with respect to steps from a state in which the automobile 1 is covered with the body cover A (see FIG. 26) to a state in which the body cover A can be folded and stored. In FIG. 26, numerals 24*a*, 24*b* indicate automobile mounting hooks which are mounted in the inside of a pipe-shaped bottom bar 24 such that the automobile mounting hooks 24*a*, 24*b* can be stored and pulled out (see FIG. 21). Further, the automobile mounting hooks 24*a*, 24*b* are connected with the bottom bar 24 using rubber strips 24*a*', 24'*b*. Here, in FIG. 21 to FIG. 25, the illustration of the automobile 1 is omitted.

Figure 21A:
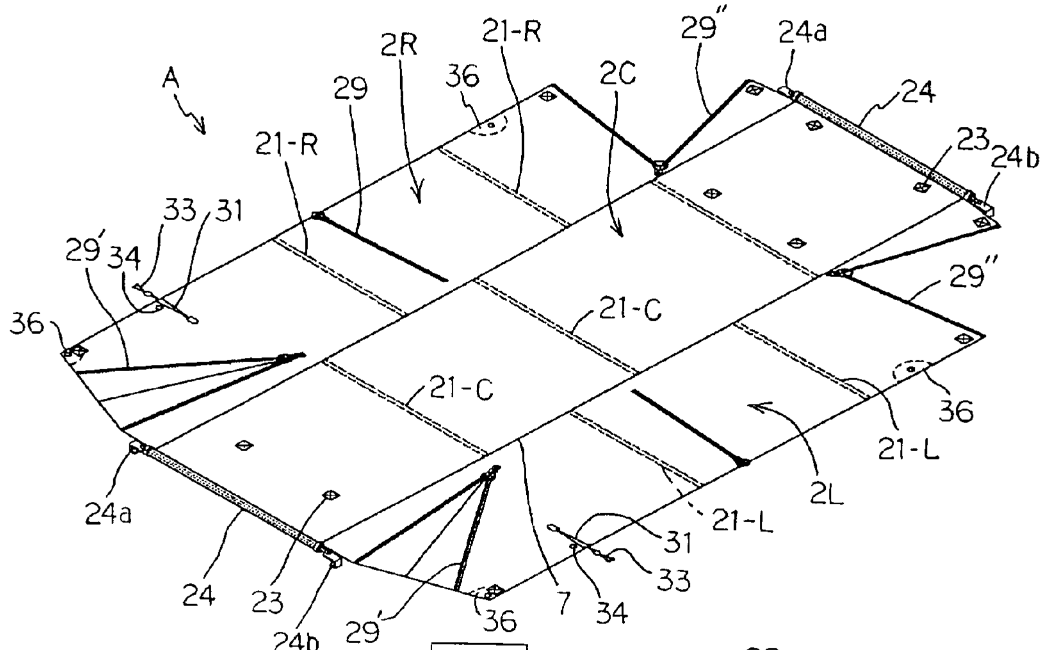
FIG. 21 is an explanatory view showing a step of folding the body cover.
Figure 21B:
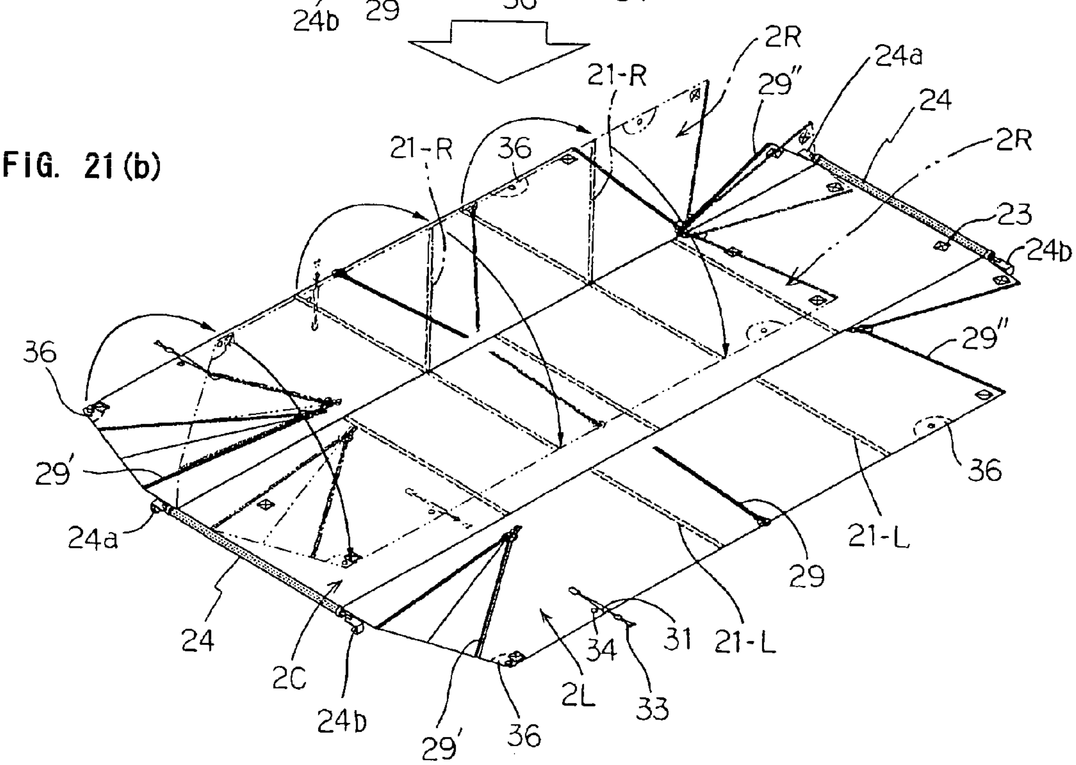
Figure 22:
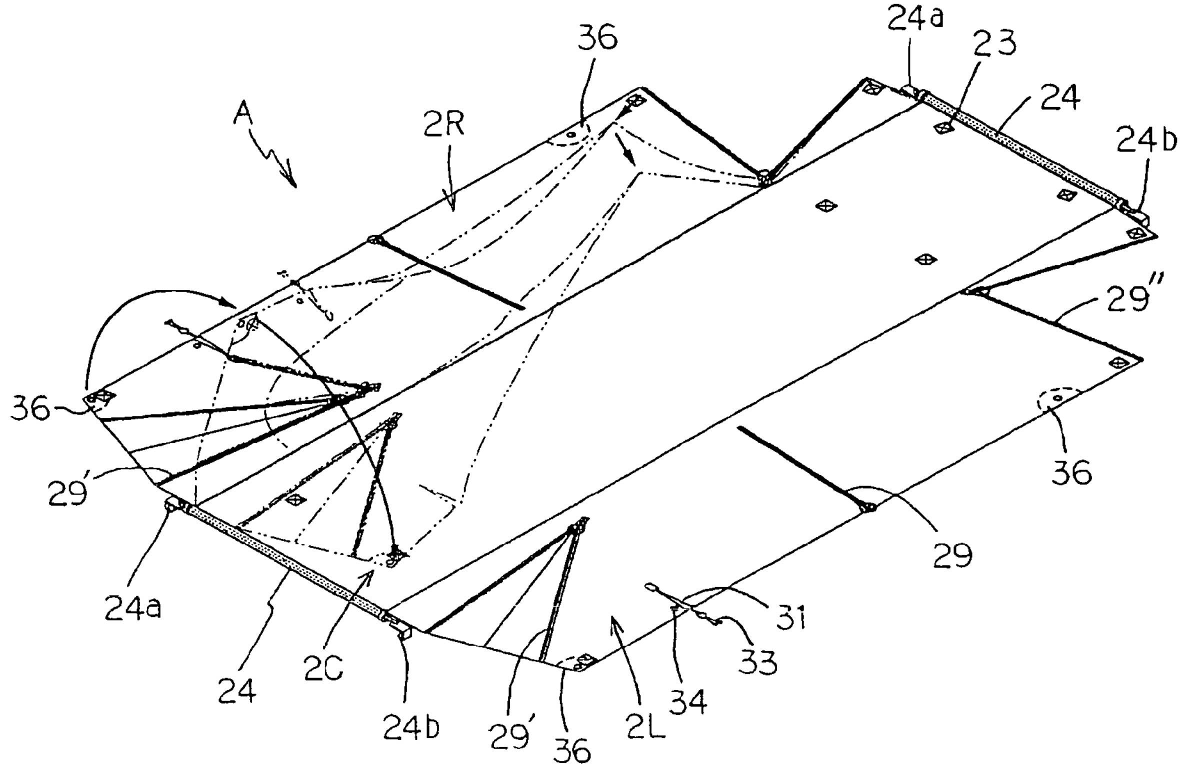
FIG. 22 is an explanatory view showing a step of folding the body cover.

As shown in FIG. 21, from a state (FIG. 21(*a*)) in which the body cover A is unfolded over the roof by releasing line fasteners 29" and the like of the body cover A which covers the automobile 1 (see FIG. 26), one end of the right-side portion 2R of the cover body 2 is gripped by a hand and is jerked and folded such that the right-side portion 2R is overlapped to the center portion 2C (FIG. 21(*b*)).

Here, also in this embodiment, since fold line portions 7, 7 and core members 21-R are formed on the right-side portion 2R, it is possible to easily perform the jerking operation and the folding of the right-side portion 2R. To consider a case in which the core members 21-R are not formed, as indicated by an imaginary line in FIG. 22, although the front end side which the user grips with his hand can be folded, since the right-side portion 2R has no rigidity, the rear side of the right-side portion 2R cannot be folded and hence, the right-side portion 2R assumes a collapsed shape. Accordingly, the operator has to move to fold the rear side and hence, the handling of the cover body 2 becomes extremely cumbersome.

Figure 23A:
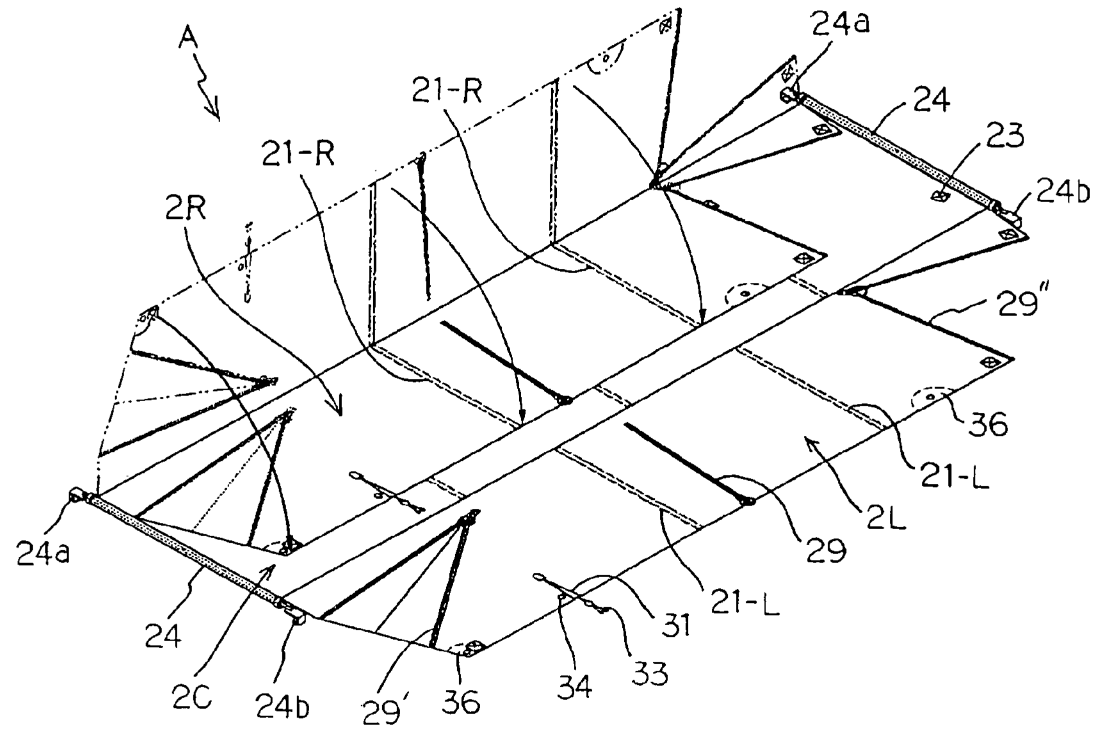
FIG. 23 is an explanatory view showing a step of folding the body cover.
Figure 23B:
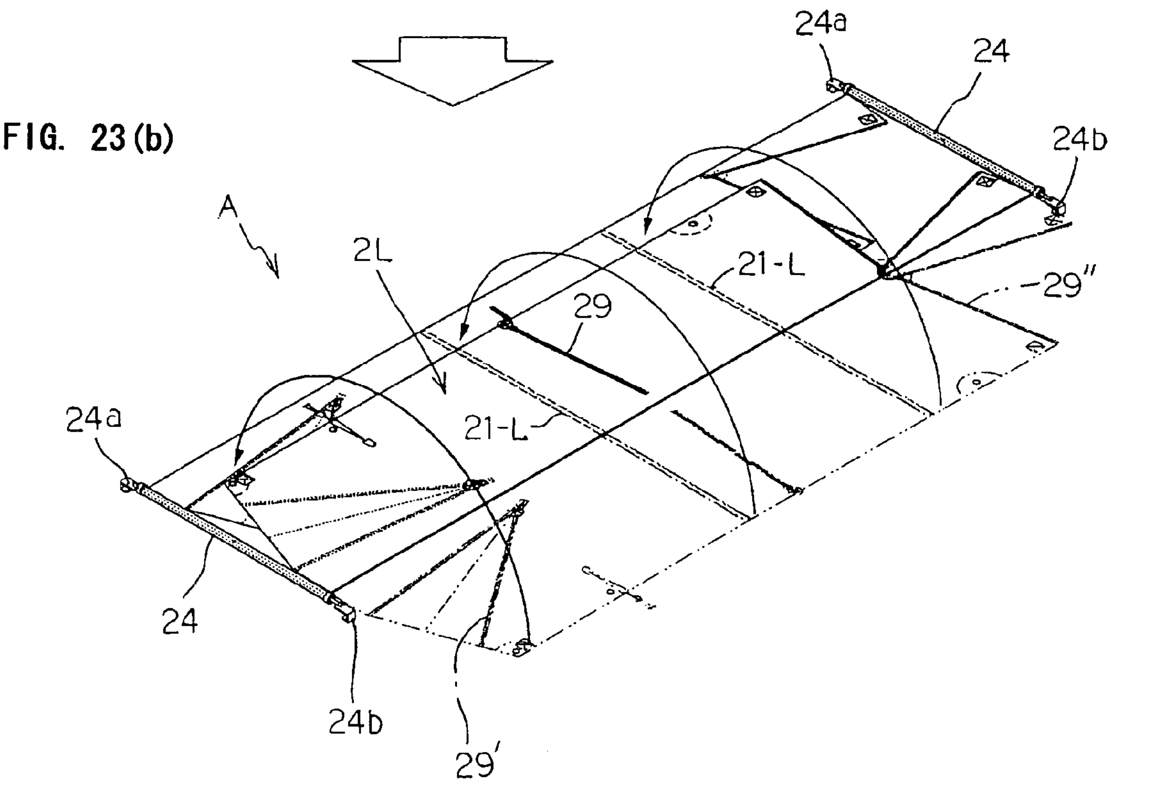

As shown in FIG. 23(*a*), after making the right-side portion 2R of the cover body 2 assume a state in which the right-side portion 2R is overlapped to the center portion 2C, the left-side portion 2L of the cover body 2 is jerked and is overlapped to the center portion 2C in the same manner (FIG. 23(*b*)).

Figure 24A:
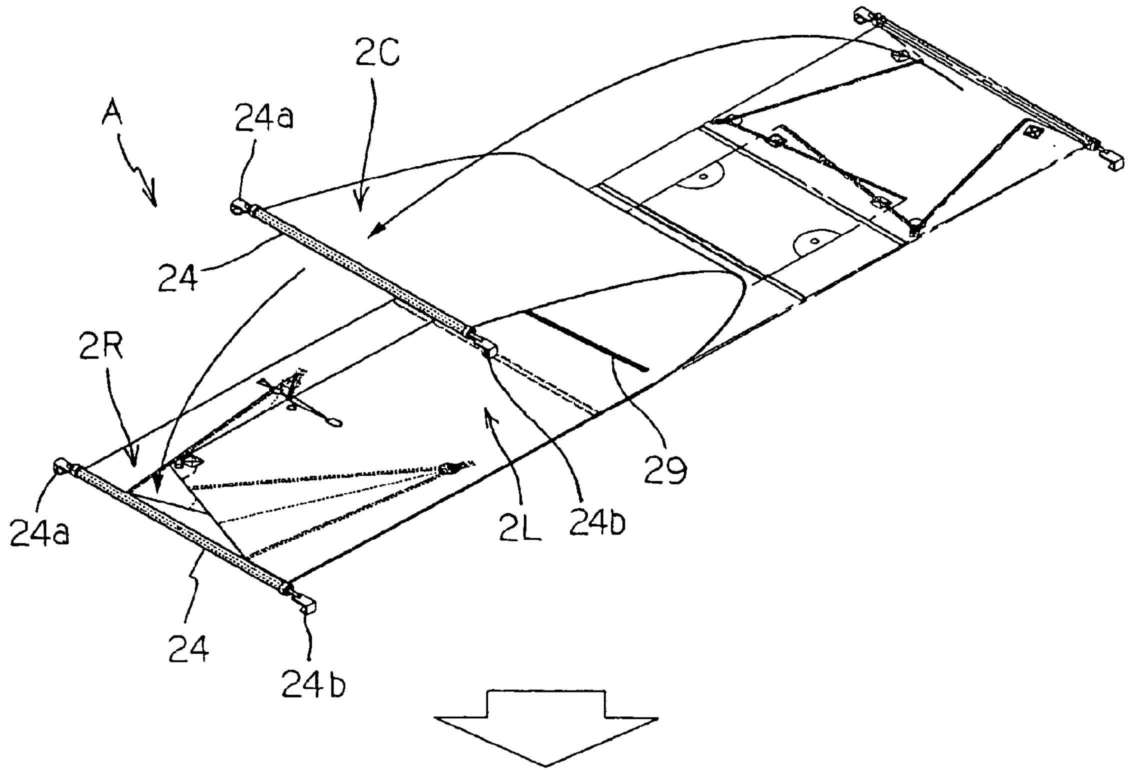
FIG. 24 is an explanatory view showing a step of folding the body cover.
Figure 24B:
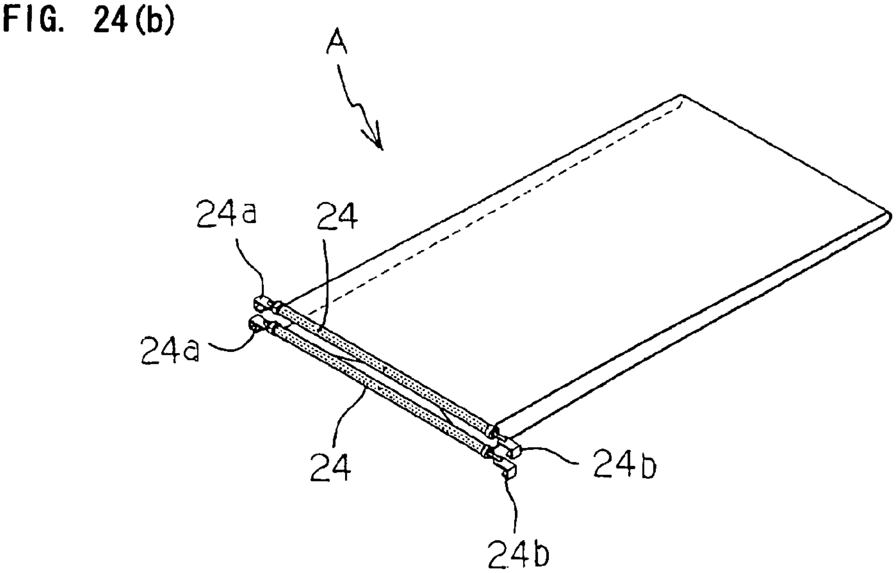

Thereafter, as shown in FIG. 24, the body cover A which is folded in three is further folded in two in the fore-and-oft direction. Further, as shown in FIG. 25, the body cover A is further folded and, thereafter, the body cover A is wrapped about the overlapped bottom bars 24 and the body cover A is fastened with bands 71 which are prepared separately to hold the body cover A in a compact roll shape, and the body cover A is stored in a suitable place.

Here, to mount the body cover A on the automobile 1, the reverse steps are taken. Also in mounting the body cover A, due to the provision of the fold line portions 7, 7 and the core members 21, the handling of the left and right-side portion 2L, 2R becomes extremely easy. Further, as mentioned previously, even when the strong wind blows, by deflecting the core members 21, it is possible to make the body cover A take the low posture to exclude the resistance of the wind as much as possible whereby the mounting operation can be performed easily.

Figure 27:
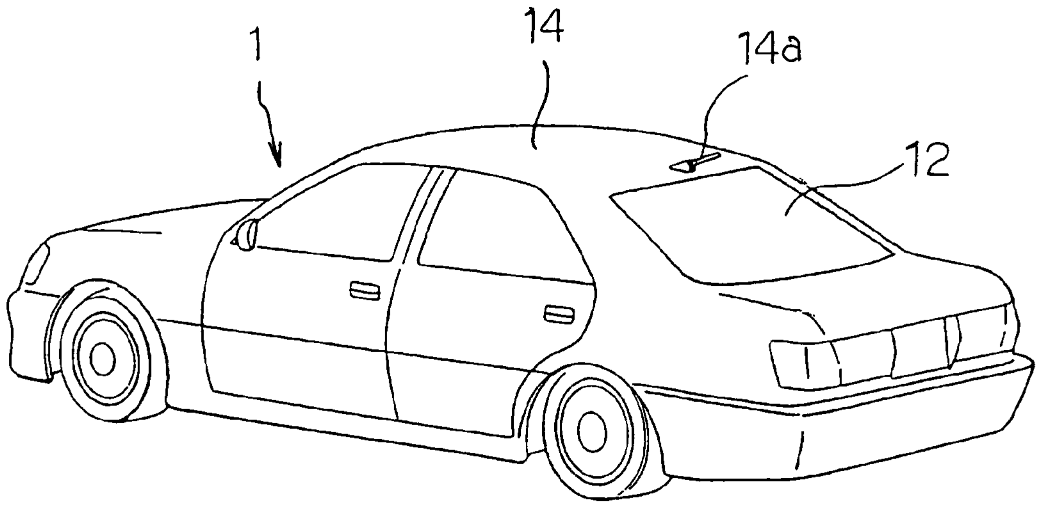
FIG. 27 is an explanatory view showing an automobile provided with an antenna.

By the way, in mounting the above-mentioned body cover A over the automobile 1, there may be a case that an antenna 14*a* of any type is provided to the center portion of the roof portion 14 of the automobile 1 as shown in FIG. 27.

Figure 28:
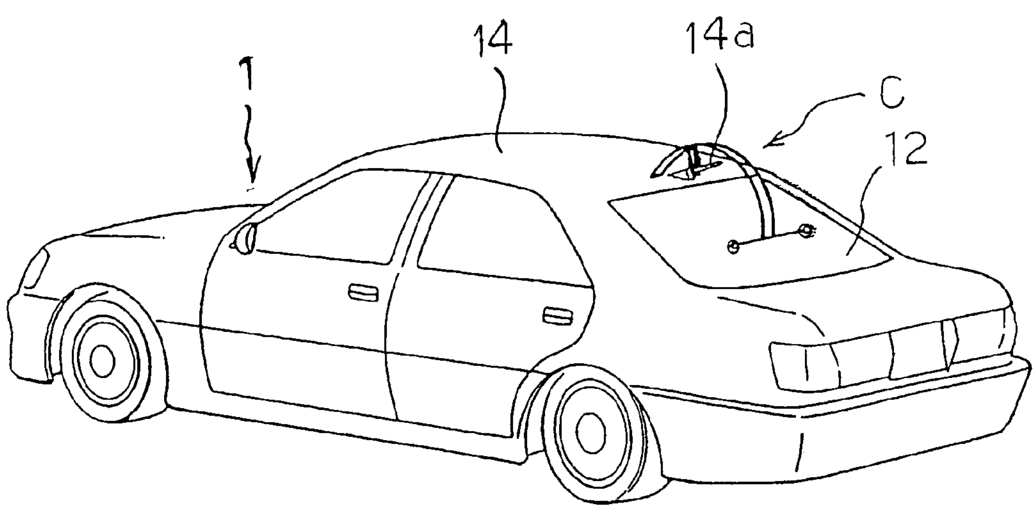
FIG. 28 is an explanatory view showing a mounting state of an antenna protecting member.

In view of the above, to enable the body cover A to cover also the antenna 14*a*, as shown in FIG. 28, an antenna protecting jig C is used so as to prevent the body cover A from being directly brought into contact with the antenna 14*a*.

Figure 29:
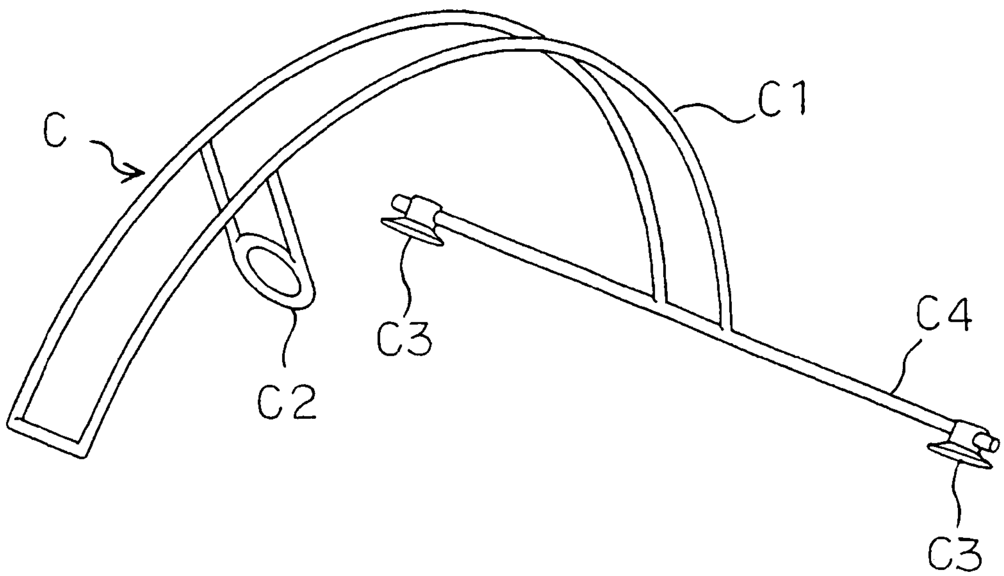
FIG. 29 is a perspective view of the antenna protecting member.

The above-mentioned antenna protecting jig C is, as shown in FIG. 29, configured such that a ring portion C2 which allows the antenna 14*a* to pass therethrough is mounted in a projecting manner on a middle portion of a body portion C1 which is formed in an arcuate shape and, at the same time, a support bar C4 which is provided with suction members C3 such as suction cups at left and right ends thereof is mounted on the rear end of the body portion. As a material of the antenna protecting jig C, a rod-like material made of metal, synthetic resin or the like can be preferably used.

Figure 30:
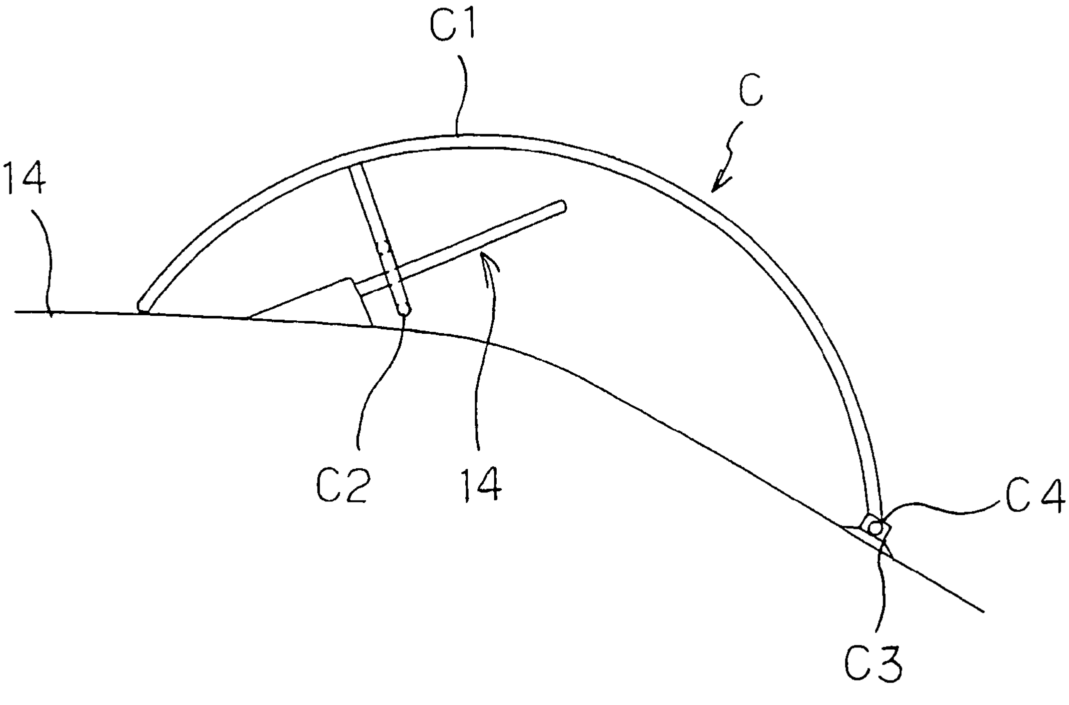
FIG. 30 is an explanatory view of the antenna protecting member as viewed from the side.

As shown in FIG. 30, the suction members C3 are adhered to the rear glass 12 or the like by suction to mount the antenna protecting jig C in a stable manner while allowing the antenna 14*a* to pass through the ring portion C2.

Figure 31:
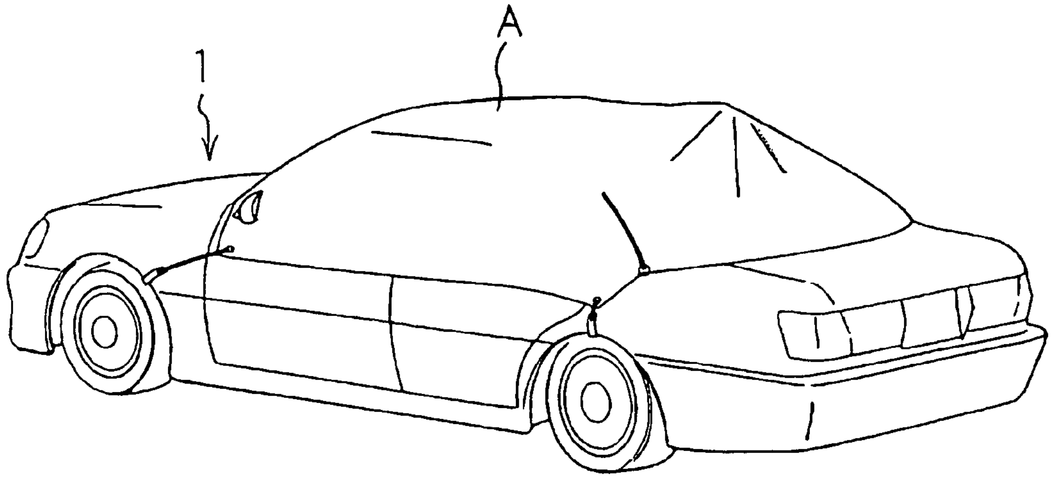
FIG. 31 is an explanatory view showing a state in which an automobile provided with an antenna is covered with a body cover.

A state in which the automobile 1 is covered with the body cover A using the antenna protecting jig C is shown in FIG. 31. The antenna 14*a* is, as mentioned previously, not directly brought into contact with the body cover A and hence, there is no possibility that the antenna 14*a* is broken during the mounting and dismounting of the body cover A whereby anyone can safely use the above-mentioned body cover A of this embodiment.

Figure 32:
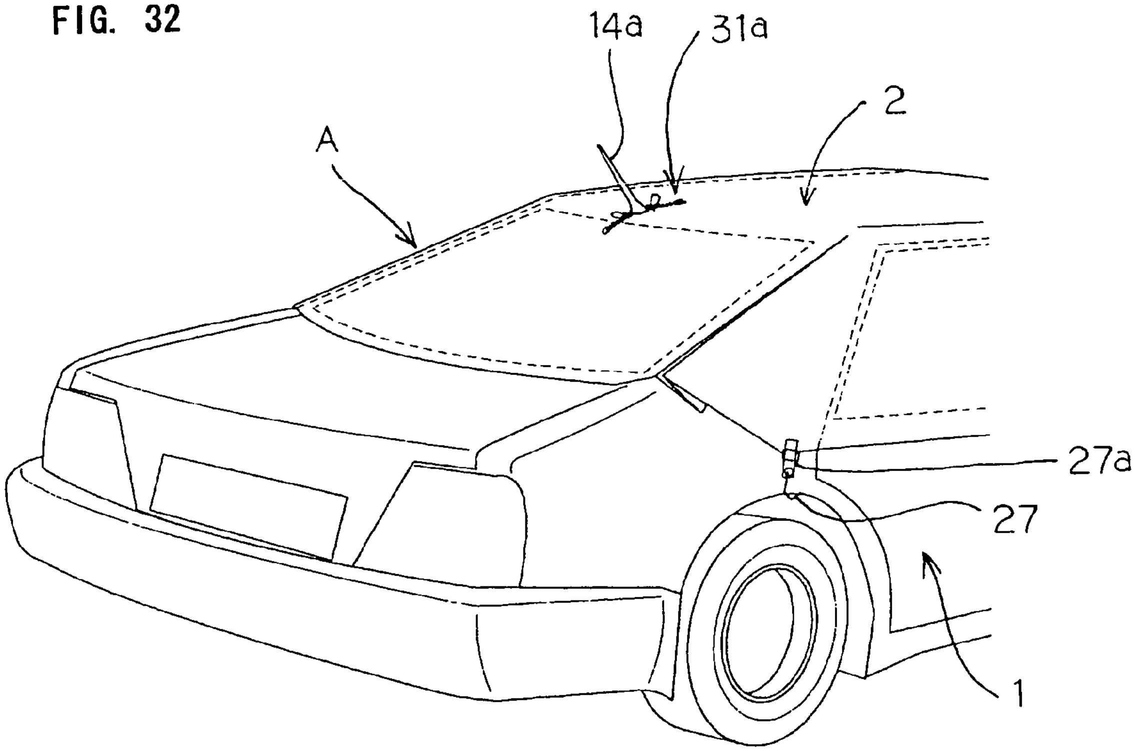
FIG. 32 is an explanatory view showing an example of a body cover for an automobile provided with an antenna.

Further, as an example of the body cover A for an automobile having an antenna 14*a*, the constitution shown in FIG. 32 may be adopted.

That is, a longitudinal antenna passing slit 31*a* is provided to a position which corresponds to the antenna 14*a* mounted on the automobile 1. As shown in the drawing, when the body cover A is automatically mounted on the automobile 1, it is possible to make the antenna 14*a* escape to the outside from the antenna passing slit 31*a*.

Figure 33:
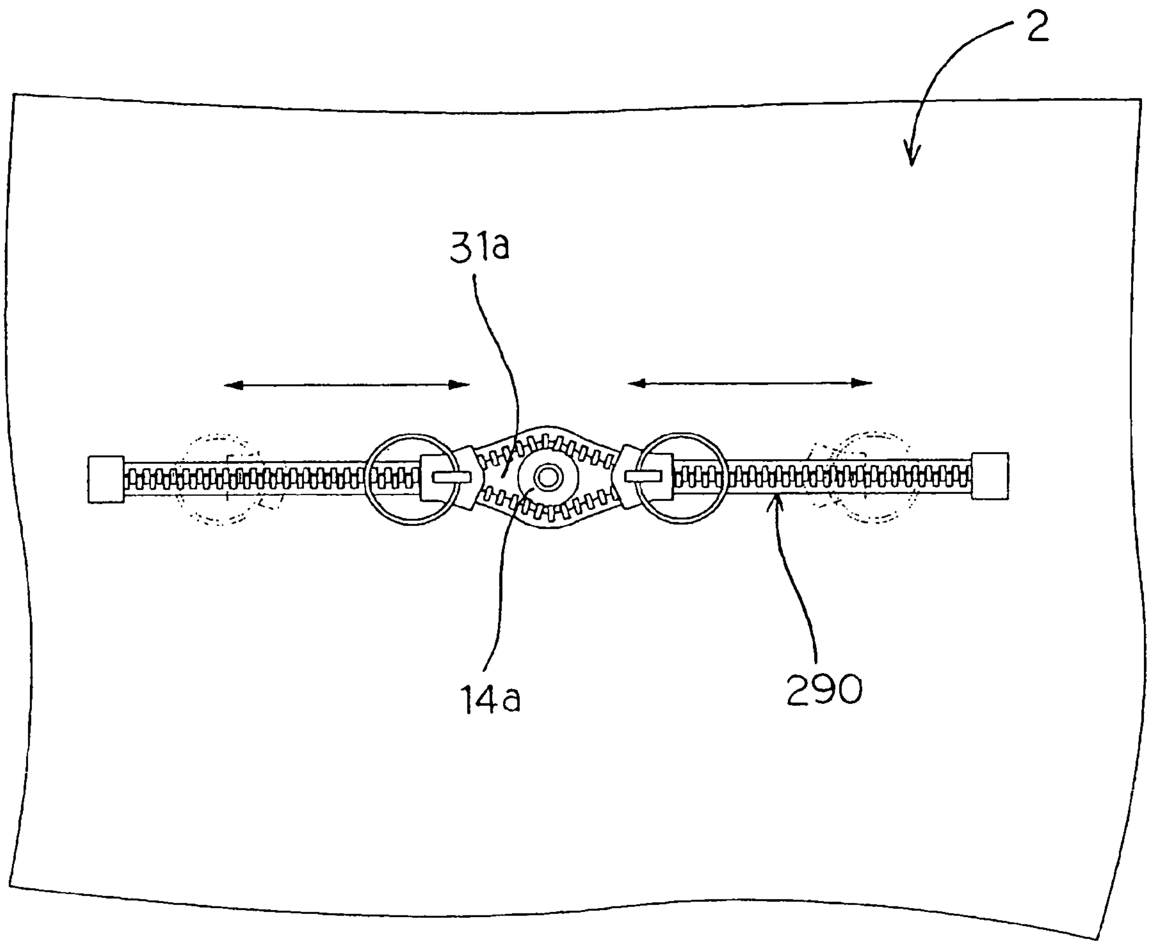
FIG. 33 is an explanatory view of an antenna inserting slit.

The antenna passing slit 31*a* according to this embodiment is formed at a center rear portion position of the body cover A such that the antenna passing slit 31*a* extends in the longitudinal direction. As shown in FIG. 33, the antenna passing slit 31*a* is provided with a slit-use line fastener 290. The slit-use line fastener 290 can be opened and closed from both-side end portions of the antenna passing slit 31*a* and hence, the slit-use line fastener 290 can easily cope with a case that the position of the antenna 14*a* is slightly displaced in the fore-and-aft direction.

Here, the position where the antenna passing slit 31*a* is formed is not limited to the position in the illustrated example and can be suitably changed corresponding to the mounting position of the antenna 14*a*. Further, antenna passing slits 310*a* may be preliminarily formed in a plurality of positions to cope with typical antenna mounting positions. Still further, the direction of forming the antenna passing slit 31*a* is not limited to the longitudinal direction of the body cover A.

Figure 34:
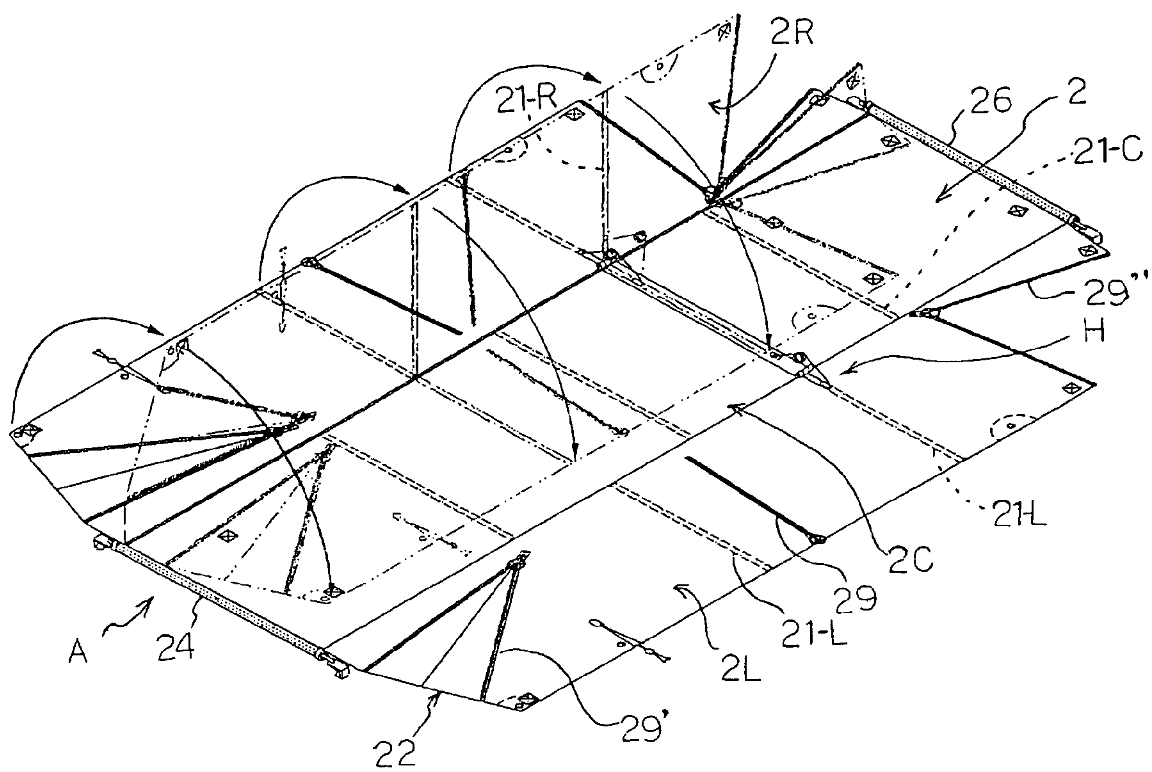
FIG. 34 is an explanatory view showing a modification of the body cover.

Here, as the modification of the body cover A of the above-mentioned embodiment, the constitution shown in FIG. 34 may be adopted.

That is, this modification is configured such that the body cover A is provided with hinge portions H which assist the bending operation of the core member 21. In this case, the core member 21 is not always required to have rigidity.

Figure 35:
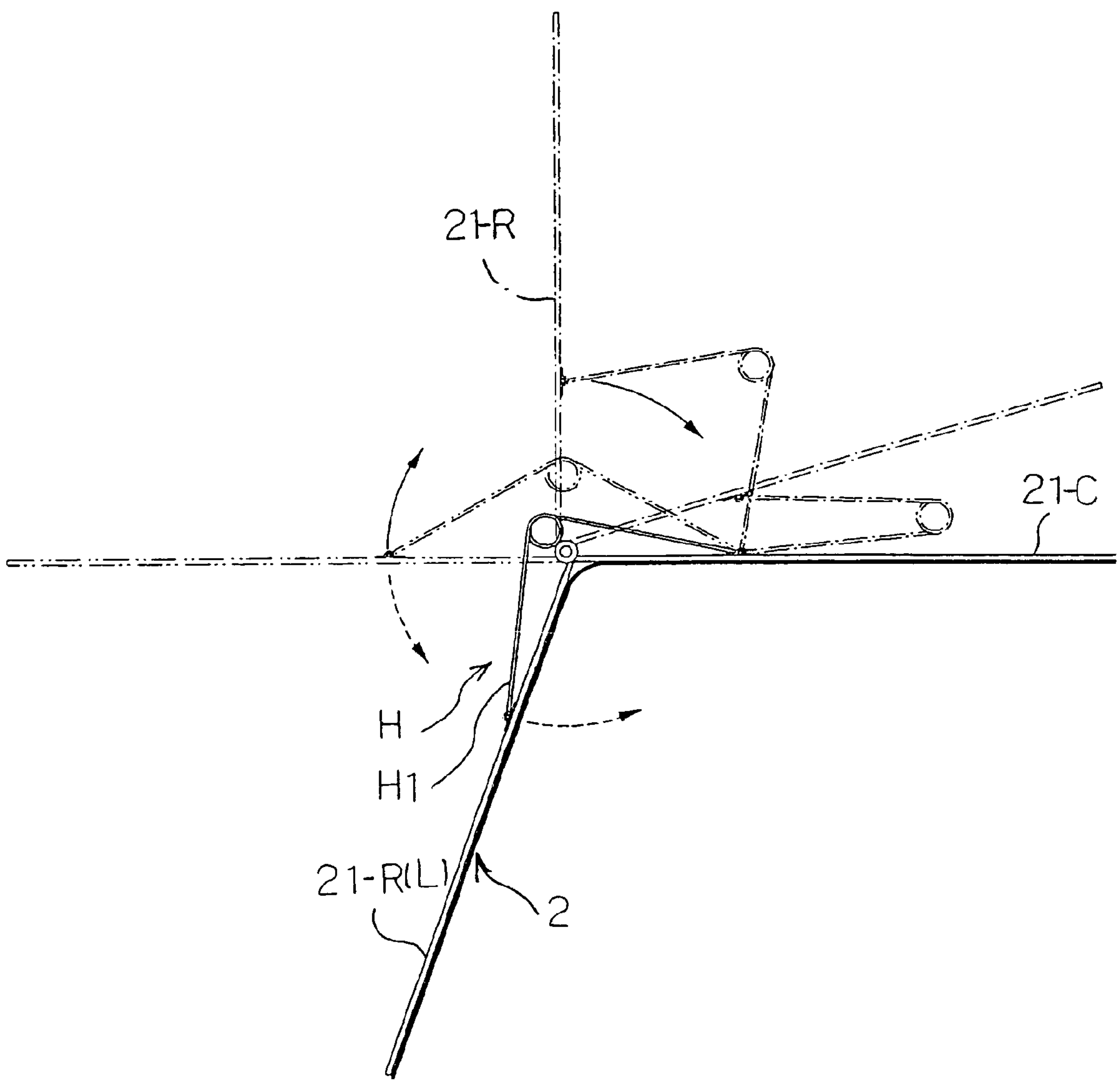
FIG. 35 is an explanatory view of hinge portions provided to core members.

The hinge portion H is, as shown in FIG. 35, arranged on the core member 21 which is arranged to extend over the center portion 2C and left and right portions 2L, 2R of the cover body 2, is mounted at a position which strides over the fold line 7, and includes a coil spring H1 which has both respective ends thereof pivotally connected to the core members 21-C, 21-R(L).

Due to such a constitution, in folding or unfolding the cover body 2, a resilient force of the coil spring H1 becomes an auxiliary force and hence, the operation can be performed with the light force. Here, although the hinge portion H is provided at one position for each of left and right sides of one core member 21, the hinge portions H may be provided to the respective core members 21.

Although the present invention has been explained in conjunction with the respective embodiments, the present invention is not limited to the above-mentioned embodiments and can be modified or replaced within a scope of the gist described in claims.

For example, the prop-up support of the stand portion 4 in the inside of the trunk room 10 is not limited to the support in the vertical direction and may be the support in the left-and-right direction. Further, the winding and the reeling-out of the body cover A may be performed electrically using a motor or the like.

Further, in the manufacturing steps of the automobile 1, the cover device B to which the present invention is applied may be incorporated in the inside of the trunk room 10 at the suitable position.

Still further, the stand portion 4 may be constituted such that the stand portion 4 can be turned down. Alternatively, the stand portion 4 may be constituted to be rotatable around an axis, wherein the stand portion 4 is rotated to change the direction of the support portion of the device body 3 or the stand portion 4 per se is laid down when the cover device B is not used so as to make more effective use of a space defined in the inside of the trunk room 10.

Figure 36:
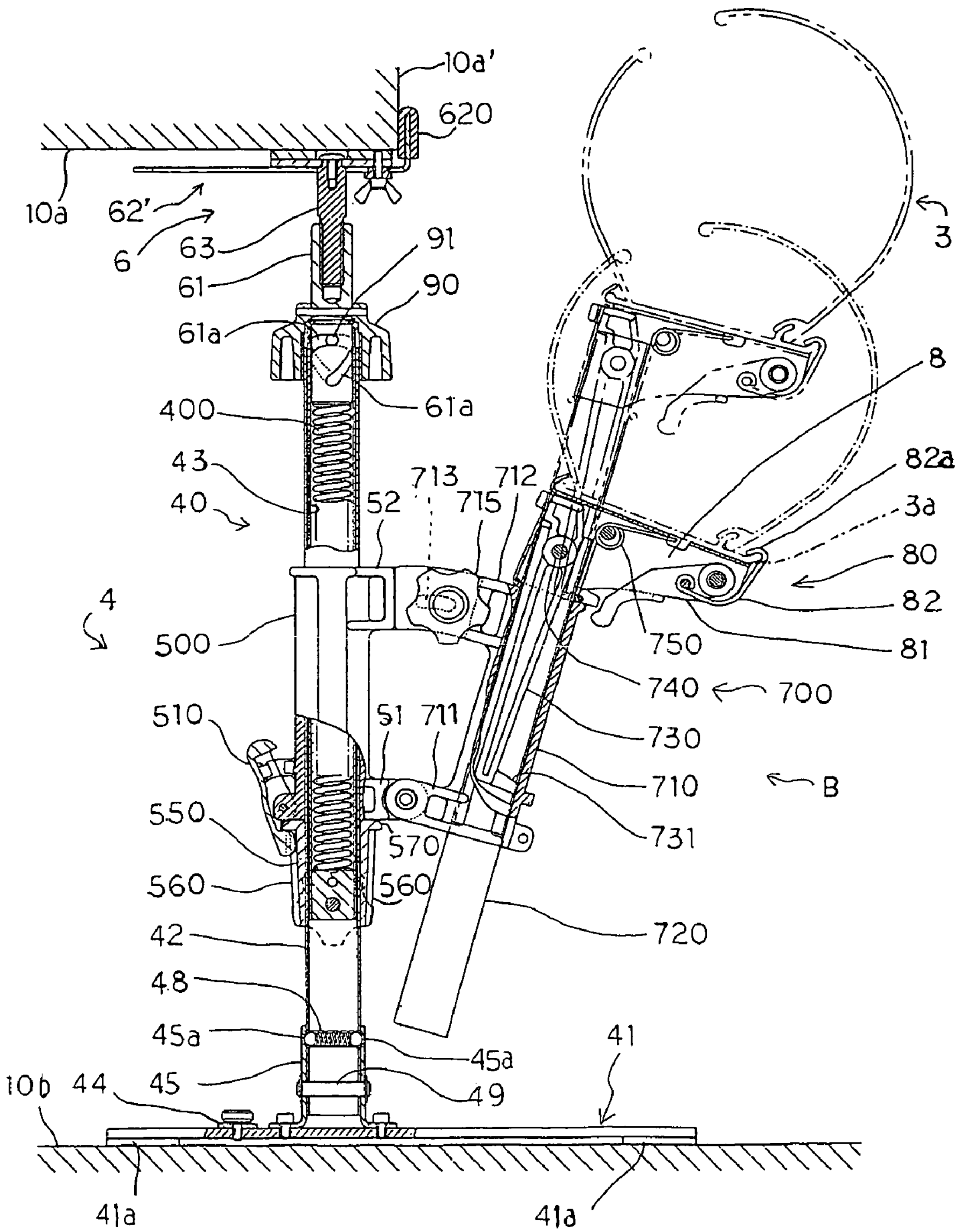
FIG. 36 is an explanatory view with a part broken away of another modification of a cover device as viewed from the side.
Figure 37:
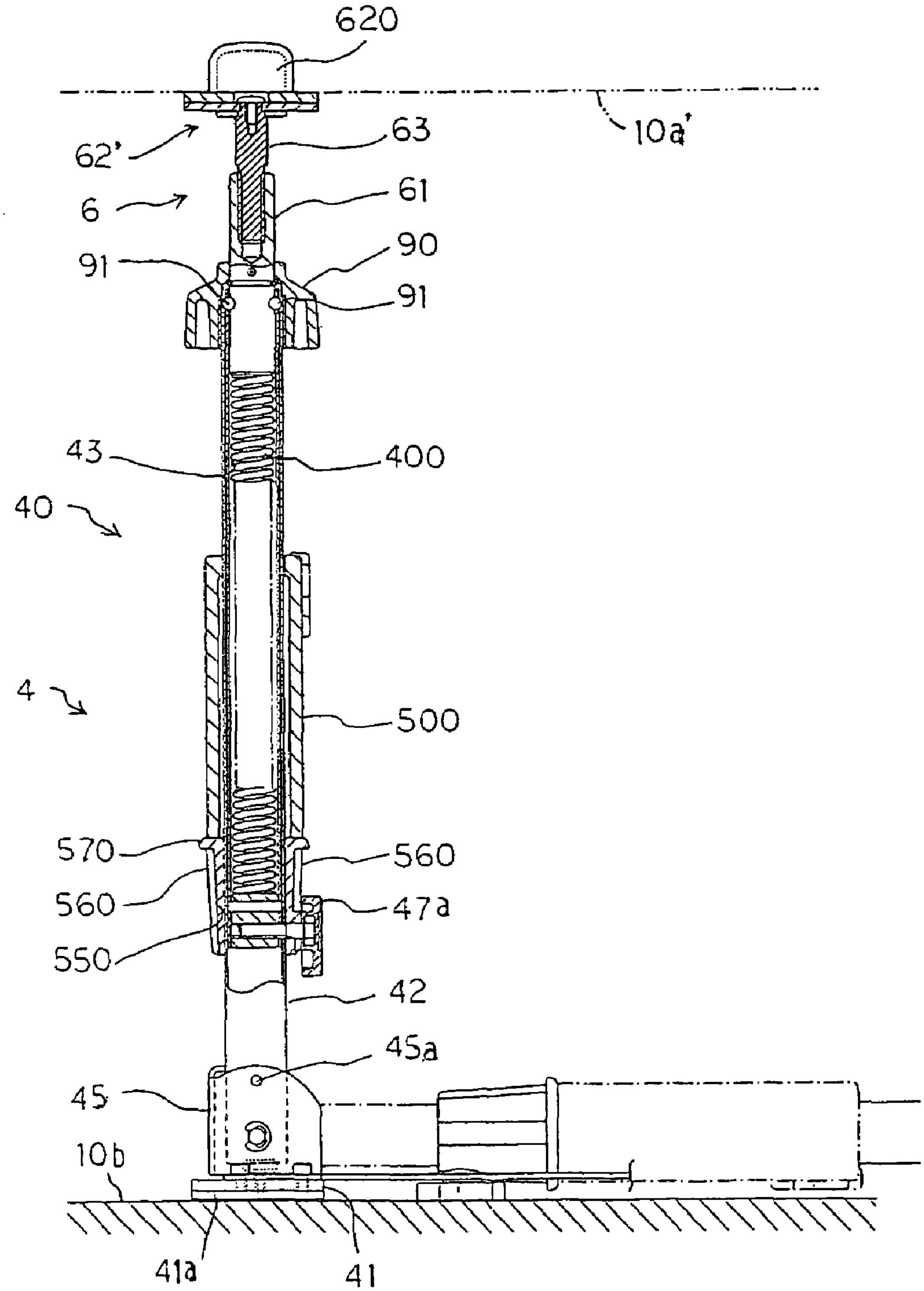
FIG. 37 is an explanatory view with a part broken away of another modification of a stand portion shown in FIG. 36 as viewed from the back.
Figure 38:
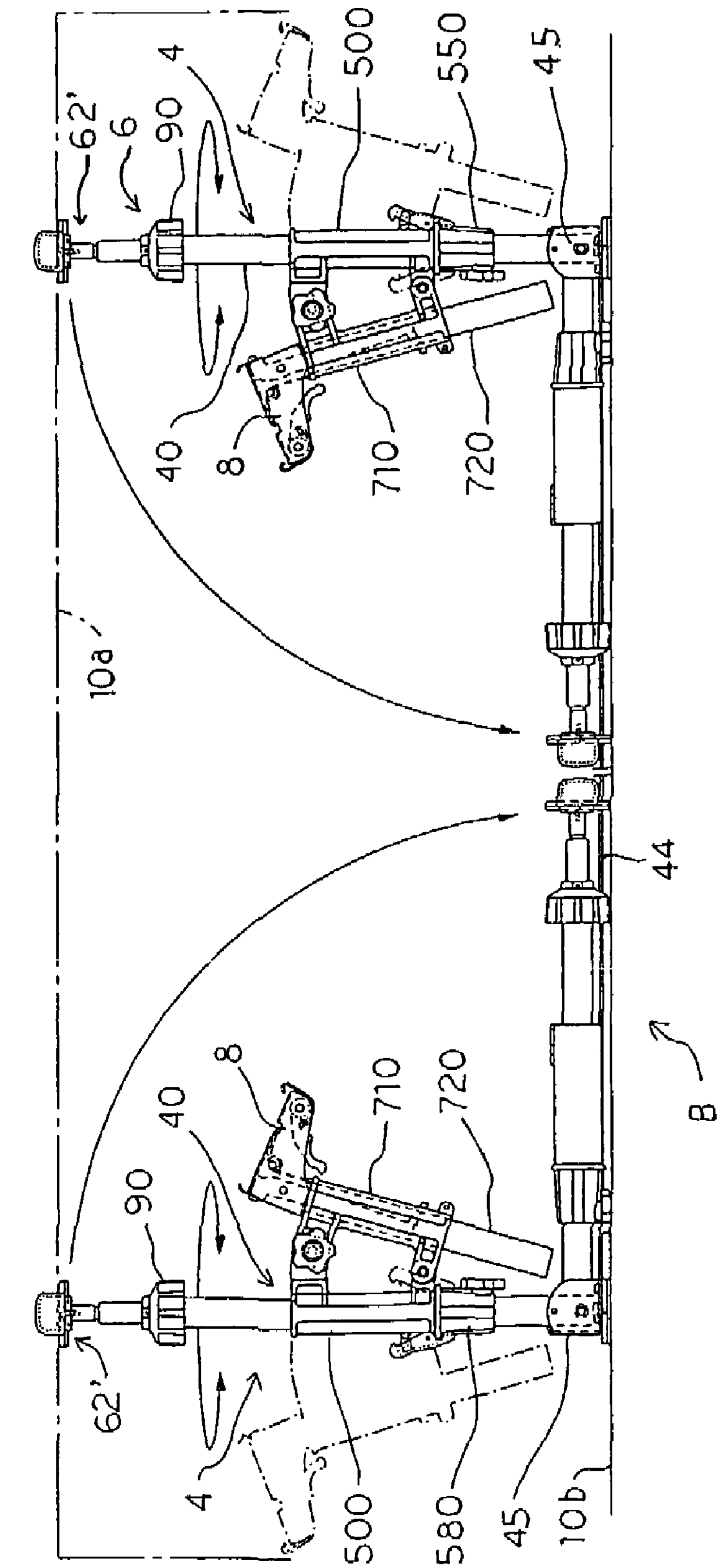
FIG. 38 is an explanatory view for explaining a use state of another modification of the cover device.

Such a cover device B is specifically explained in conjunction with FIG. 36 to FIG. 38. Here, with respect to symbols used here, the same symbols are used with respect to the constitutional elements identical with the constitutional elements explained in conjunction with FIG. 11 to FIG. 17.

This modification is characterized in that a support portion which elevatably supports the above-mentioned device body 3 is mounted on a support strut 40 in a state that the support portion is rotatable about a center axis of the support strut 40 and, at the same time, the support strut 40 can be turned down in the direction orthogonal to the longitudinal direction of a leg seat 41.

As shown in FIG. 36 and FIG. 37, the support strut 40 of the stand portion 4 is configured such that a bottomed inner sleeve 43 which inserts a coil spring 400 therein is fitted into an outer sleeve 42 and a rod body 61 is fitted into an upper end portion of the inner sleeve 43. A lower end portion of the outer sleeve 42 is loosely fitted into the inside of a connection member 45 having an approximately U-shaped shape in a plan view, wherein the outer sleeve 42 is pivotally mounted by a pivot shaft 49 which penetrates one side portion of the connection member 45, the outer sleeve 42 and the other side portion of the connection member 45 such that the outer sleeve 42 can be turned down. The connection member 45 is fixedly mounted on a leg seat 41 upright such that a U-shaped opening portion thereof faces a side edge of the leg seat 41. Due to such a constitution, as shown in FIG. 38, the support strut 40 is configured to be turned down in the direction orthogonal to the longitudinal direction of the leg seat 41.

As shown in FIG. 36, in a portion of the outer sleeve 42 which is loosely fitted into the connection member 45 and is arranged slightly above the position at which the pivot shaft 49 penetrates, a ball plunger 48 is disposed, while in portions of the connection member 45 right above the pivot shaft 49, fitting holes 45*a*, 45*a* which allow the fitting of two balls provided to the ball plunger 48 therein are formed. By allowing the fitting of both balls of the ball plunger 48 into the fitting holes 45*a*, 45*a*, the erected posture of the support strut 40 is maintained and, at the same time, by applying a given external force to the support strut 40, both balls of the ball plunger 48 are disengaged from the fitting holes 45*a*, 45*a* whereby the support strut 40 can be turned down with one-touch operation.

On the other hand, an approximately double-skirted cap member 90 which covers a periphery of an upper end portion of the inner sleeve 43 and prevents the rod body 61 from being slipped out from the inner sleeve 43 is fitted on and fixed to the above-mentioned rod body 61. Two hole are formed in a peripheral surface of the inner sleeve 43 in the vicinity of an upper end thereof and balls 91, 91 are respectively loosely fitted into both holes. On an outer peripheral surface of the rod body 61 which faces both balls 91, 91, grooves 61*a*, 61*a* having a suitable length are formed in a double helical shape in the longitudinal direction of the inner sleeve 43. Both balls 91, 91 which are rotatably fitted into both grooves 61*a*, 61*a* are sandwiched between the grooves 61*a*, 61*a* and an inner peripheral surface of the cap member 90.

The rod body 61 is biased toward the ceiling wall 10*a* side by the coil spring 400. Along with the projection of the rod body 61 from the inner sleeve 43 by this biasing force, the balls 91, 91 roll in the inside of the grooves 61*a*, 61*a* which correspond to the balls 91, 91 and are brought into contact with outer ends of the grooves 61*a*, 61*a* which face the inner sleeve 43 whereby the projection of the rod body 61 from the inner sleeve 43 is restricted. Due to such a constitution, the removal of the rod body 61 from the inner sleeve 43 is prevented and hence, in releasing the prop-up support of the stand portion 4 which is arranged between the ceiling wall 10*a* and the bottom wall 10*b*, it is possible to perform such a releasing operation safely.

On the other hand, when the cap member 90 is rotated in a given direction, along with the rolling of the balls 91, 91 in the grooves 61*a*, 61*a*, the rod body 61 is pushed into the inside of the inner sleeve 43. Then, it is possible to push the rod body 61 into the inside of the inner sleeve 43 until the balls 91, 91 are brought into contact with inner ends of the i grooves 61*a*, 61*a* which face the inner sleeve 43. Accordingly, it is possible to shorten a length size of the stand portion 4 without manipulating a threaded rod 63 and hence, the operation to again prop up and support the stand portion 4 which is in the released condition as described above between the ceiling wall 10*a* and the bottom wall 10*b* can be performed easily.

Here, a rotary sleeve body 500 is rotatably fitted on a middle portion of the outer sleeve 42, while the rotary sleeve 500 is carried on a rim 570 which is formed on an upper end edge of a cylindrical rotary reception body 550. On an outer peripheral surface of the rotary reception body 550, a plurality of longitudinal flange portions 560, 560, . . . are mounted upright parallel to the axial direction of the outer sleeve 42. Further, the rotary reception body 550 is fixedly secured to the support strut 40 by a handle 47*a* having a leg portion which is inserted into the rotary reception body 550, the outer sleeve 42 and the inner sleeve 43. Here, holes which allow the insertion of the leg portion of the handle 47*a* are formed in the outer sleeve 42 in plural stages in the axial direction at a suitable distance. By allowing the insertion of the leg portion of the handle 47*a* in the hole in the suitable stage, it is possible to adjust the length of the support strut 40 to a size corresponding to a size between the ceiling wall 10*a* and the bottom wall 10*b* of the trunk.

On an outer peripheral surface of the rotary sleeve body 500 in the vicinity of a lower end thereof, a rotary lever 510 which connects the rotary sleeve body 500 and the above-mentioned rotary reception body 550 is pivotally supported such that the rotary lever 510 is tiltable in the axis direction of the rotary sleeve body 500. By fitting on and engaging a hook portion formed on a lower end of the rotary lever 510 with a rim 570 disposed between two longitudinal flange portions 560, 560 of the rotary reception body 550 which are arranged close to each other, it is possible to connect and fix the rotary sleeve body 500 to the rotary reception body 550 and, at the same time, it is possible to prevent the rotation of the rotary sleeve body 500 about the center axis of the outer sleeve 42.

With respect to such a rotary sleeve body 500, the engagement of the hook portion and the rim 570 is released by tilting the rotary lever 510 which is biased by a spring against the biasing force, the rotary sleeve body 500 is rotated about the center axis of the outer sleeve 42 in such a state and, thereafter, the hook portion is again engaged with the rim 570 disposed between the suitable longitudinal flange portions 560, 560 of the rotary reception body 550 whereby it is possible to rotate the rotary sleeve body 500 to a position of an arbitrary rotational angle.

Here, the device body 3 is supported such that the device body 3 is advanced or retracted in the oblique vertical direction with respect to the axial direction of the support strut 40 by means of a slide mechanism 700. The slide mechanism 700 is configured such that a support pipe 720 having an upper end on which the mounting portion 8 of the device body 3 is mounted is slidably fitted into the inside of a cylindrical holder 710 and the holder 710 is connected to the above-mentioned rotary sleeve body 500 such that the holder 710 can adjust a posture thereof within a given inclination range with respect to the axial direction of the support strut 40.

That is, a lower connection portion 711 which is mounted on the vicinity of the lower end of the holder 710 is journal-mounted on a lower bracket 51 which is mounted on the above-mentioned rotary sleeve body 500, while an upper connection portion 712 of the holder 710 is threadedly mounted on an upper bracket 52 of the rotary sleeve body 500 in a state that a leg portion of a connection handle 715 is made to pass through an oblong posture adjustment hole 713 formed in the upper connection portion 712. Further, after loosening the connection handle 715 and adjusting the posture of the holder 710 about a connection shaft of the lower connection portion 711 within a range of a posture adjustment hole 713 formed in the upper connection portion 712, the connection handle 715 is fastened so as to fix the posture of the holder 710.

A tiltable leg member 730 having a scissor-blade-like shape in a side view is fitted into a support pipe 720 such that a distal end portion thereof is disposed in the inside of the support pipe 720 and a proximal end portion projects from the support pipe 720. The tiltable leg member 730 is tiltably supported on the vicinity of an upper end of the support pipe 720 using a pivot shaft 740 which is arranged orthogonal to a center axis of the support pipe 720. The mounting portion 8 is fixed to a flat proximal end portion of the tiltable leg member 730, while the mounting portion 8 is biased toward the support strut 40 side by a spring 750 interposed between an outer peripheral surface of the vicinity of the upper end of the support pipe 720 and a lower surface of the mounting portion 8.

On the other hand, on a portion the tiltable leg member 730 in the vicinity of the distal end thereof and at a side opposite to the support strut 40, a projection portion 731 having an approximately rectangular shape in a side view is mounted, while a hole which allows the projection portion 731 to project outwardly is formed in a portion of the support pipe 720 which faces the projection portion 731 in an opposed manner.

In such a slide mechanism 700, when the support pipe 720 is pulled up in the oblique upward direction so as to position the hole formed in the support pipe 720 above the upper end of the holder 710, the mounting portion 8 and the tiltable leg member 730 which is connected to the mounting portion 8 are tilted to the support strut 40 side due to the biasing force of the spring 750 and the projection portion 731 of the tiltable leg member 730 is projected outwardly through the hole formed in the support pipe 720. In such a state, when a pulling force applied to the support pipe 720 is removed, the projection portion 731 is brought into contact with an upper end edge of the holder 710 due to the weight of the device body 3. Accordingly, the device body 3 is elevated from the lower position where the device body 3 assumes the non-use state to the upper position where the device body 3 assumes the use state and the device body 3 is held in the use state. On the other hand, the weight of the device body 3 is supported by the holder 710. Accordingly, it is possible to bring the device body 3 from the non-use state to the use state by one-touch operation.

On the other hand, to bring the device body 3 in the use state into the non-use state, the device body 3 is pulled to a side opposite to the support strut 40 so as to tilt the tiltable leg member 730 by way of the mounting portion 8 thus retracting the projection portion 731 into the inside of the support pipe 720. Then, due to the weight of the device body 3, the support pipe 720 is lowered in the holder 710 until the mounting portion 8 is brought into contact with the upper end edge of the holder 710. Accordingly, it is also possible to bring the device body 3 in the use state into the non-use state by one-touch operation.

The cover device B according to this modification has the above-mentioned constitution, as shown in FIG. 38, depending on the use mode of the trunk, in a state that the device body is removed, by rotating one or both of the rotary sleeve bodies 500, 500 provided to the pair of stand portions 4, it is possible to prevent the holders 710, 710 and the mounting portions 8, 8 from becoming obstacles in the trunk. Further, by turning down one or both of the support struts 40, 40 provided to both stand portions 4, 4, it is possible to make more effective use of the inside of the trunk when the cover device B is not used.

INDUSTRIAL APPLICABILITY (1) According to the present invention, fold line portions for guiding folding are formed on the cover body such that the fold line portions extend in the longitudinal direction of the cover body, the cover body is configured to be foldable along the fold line portions, and a plurality of core members comprised of spring steel are arranged between the fold line portions and left and right longitudinal-side edges of the cover body in a spaced-apart manner in the longitudinal direction. Accordingly, the cover body has the sufficient rigidity and hence, the operation to unfold the cover body on the roof can be performed easily and smoothly. Further, also in storing the cover body, the body cover folding operation is facilitated, the winding of the body cover into the cover device can be easily performed, and the operation can be facilitated even when the wind blows.

(2) According to the present invention, the above-mentioned fold line portions for guiding folding are formed in plural numbers and hence, it is possible to provide the body cover in versatile folding mode in which the body cover is folded in three or more.

(3) According to the present invention, the above-mentioned cover body is formed in a shape which is capable of covering the roof portion and front-and-rear and left-and-right window portions of the automobile, and is foldable in three along the longitudinal direction by way of two fold line portions into the center portion which covers the front and rear window portions and the left-side portion and the right-side portion which cover left and right window portions, and a plurality of core members comprised of spring steel are formed on the center portion, the left-side portion and the right-side portions respectively. Accordingly, in addition to the advantageous effects described in the above-mentioned (1), it is possible to jerk the whole left-side or right-side portion of the body cover by merely performing the jerking operation by gripping one portion of the front side or the rear side of the left-side or right-side portion and hence, handling of the cover body becomes extremely easy.

(4) According to the present invention, the above-mentioned core members are displaced from each other such that the core members are not overlapped to each other when the cover body is folded in three. Accordingly, in addition to the advantageous effects described in the above-mentioned (1) to (3), it is possible to eliminate the possibility that the core members are overlapped so that the thickness of the cover body is increased thus making the handling of the winding of the cover body difficult.

(5) According to the present invention, the above-mentioned core members are formed of a strip-like body having resiliency. Accordingly, in addition to the advantageous effects described in the above-mentioned (1) to (4), it is possible to prevent the body cover from becoming particularly heavy and, at the same time, there is no possibility that the shape of the cover body is particularly limited.

(6) Further, according to the present invention, the body cover includes the hinge portions which facilitate the folding operation of the core members. Accordingly, in addition to the advantageous effects described in the above-mentioned (1) to (5), the jerking operation and the folding operation of the cover can be performed with a small force.

(7) According to the present invention, the pipe-like core members are provided to front ends and/or rear ends of the above-mentioned cover body. Accordingly, in addition to the advantageous effects described in the above-mentioned (1) to (6), it is possible to make use of the pipe-like core member as the grip portion and, at the same time, the cover body can be wound using the pipe-like core member as the center and hence, it is possible to smoothly perform the cover mounting and dismounting operations.

According to the present invention, the above-mentioned cover body is configured to be stored in an automobile body cover device which includes winding means such that the above-mentioned cover body is reeled out from and is wound in the automobile body cover device. Accordingly, in addition to the advantageous effects described in the above-mentioned (1) to (7), it is possible to perform the mounting operation of the body cover by reeling out or advancing the body cover from the inside of the trunk room along the rear glass or it is possible to reversely store the folded body cover into the inside of the trunk room along the rear glass whereby the operability is remarkably enhanced.

What is claimed is:

1. An automobile body cover comprising:

a cover body which has fold line portions for guiding folding, the fold lines formed on the cover body and extending in parallel in a longitudinal direction of the cover body, the cover body being configured to be foldable along the fold line portions;

a plurality of core members which are arranged between the folding line portions and left and right longitudinal-side edges of the cover body in a spaced-apart manner in the longitudinal direction, the core members being formed of spring steel, gore portions which are formed in the cover body for absorbing a gap between a state in which the cover body is unfolded and a state in which the automobile is covered with the cover body in a good shape, the gore portions being formed at front and rear sides of left and right-side portions of the cover body, and core members which are formed on fold lines of the gore portions which form an approximately V-shape.

2. An automobile body cover comprising:

a cover body which is formed in a shape capable of covering a roof portion and front-and-rear and left-and-right window portions of an automobile, the cover body being foldable in three along a longitudinal direction by way of twofold line portions into a center portion which covers the front and rear window portions and a roof portion and a left-side portion and a right-side portion which cover left and right window portions respectively;

a plurality of core members which are formed of spring steel and are formed on the center portion, the left-side portion and the right-side portion respectively, gore portions which are formed in the cover body for absorbing a gap between a state in which the cover body is unfolded and a state in which the automobile is covered with the cover body in a good shape, the gore portions being formed at front and rear sides of left and right-side portions of the cover body, and core members which are formed on fold lines of the gore portions which form an approximately V-shape.

3. An automobile body cover according to claim 1, wherein the fold line portions for guiding folding are formed in plural numbers.

4. An automobile body cover according to claim 1, wherein the core members are displaced from each other such that the core members are not overlapped to each other when the cover body is folded in three.

5. An automobile body cover according to claim 1, wherein pipe-shaped core members are provided in front ends and/or rear ends of the cover body.

6. An automobile body cover according to claim 1, wherein the cover body is configured to be stored in an automobile body cover device which includes winding means such that the cover body is reeled out from and is wound in the automobile body cover device.

7. An automobile body cover according to claim 3, wherein the core members are displaced from each other such that the core members are not overlapped to each other when the cover body is folded in three.

8. An automobile body cover according to claim 2, wherein the core members are displaced from each other such that the core members are not overlapped to each other when the cover body is folded in three.

9. An automobile body cover according to claim 3, wherein pipe-shaped core members are provided to front ends and/or rear ends of the cover body.

10. An automobile body cover according to claim 2, wherein pipe-shaped core members are provided to front ends and/or rear ends of the cover body.

11. An automobile body cover according to claim 4, wherein pipe-shaped core members are provided to front ends and/or rear ends of the cover body.

12. An automobile body cover according to claim 3, wherein the cover body is configured to be stored in an automobile body cover device which includes winding means such that the cover body is reeled out from and is wound in the automobile body cover device.

13. An automobile body cover according to claim 2, wherein the cover body is configured to be stored in an automobile body cover device which includes winding means such that the cover body is reeled out from and is wound in the automobile body cover device.

14. An automobile body cover according to claim 4, wherein the cover body is configured to be stored in an automobile body cover device which includes winding means such that the cover body is reeled out from and is wound in the automobile body cover device.

15. An automobile body cover according to claim 7, wherein the cover body is configured to be stored in an automobile body cover device which includes winding means such that the cover body is reeled out from and is would in the automobile body cover device.

* * * * *